United States Patent [19]

Holzhausen et al.

[11] Patent Number: 5,081,613
[45] Date of Patent: Jan. 14, 1992

[54] METHOD OF IDENTIFICATION OF WELL DAMAGE AND DOWNHOLE IRREGULARITIES

[75] Inventors: Gary R. Holzhausen; Gregory S. Baker; Howard N. Egan, all of Santa Cruz, Calif.

[73] Assignee: Applied Geomechanics, Santa Cruz, Calif.

[21] Appl. No.: 250,036

[22] Filed: Sep. 27, 1988

[51] Int. Cl.$^5$ .............................................. G01V 1/40
[52] U.S. Cl. ........................................ 367/86; 367/35; 181/105; 73/151; 166/250
[58] Field of Search ..................... 181/105, 106, 119; 367/33, 35, 86; 73/151; 166/250

[56] References Cited

U.S. PATENT DOCUMENTS

| | | | |
|---|---|---|---|
| 3,909,776 | 9/1975 | Broding et al. | 181/119 |
| 4,271,696 | 6/1981 | Wood | 73/37 |
| 4,353,244 | 10/1982 | Wood | 73/37 |
| 4,354,381 | 10/1982 | Medlin et al. | 73/151 |
| 4,372,380 | 2/1983 | Smith et al. | 166/250 |
| 4,393,933 | 7/1983 | Nolte et al. | 166/250 |
| 4,398,416 | 8/1983 | Nolte | 73/155 |
| 4,432,078 | 2/1984 | Silverman | 367/37 |
| 4,458,245 | 7/1984 | Crosnier et al. | 367/35 |
| 4,529,036 | 7/1985 | Daneshy et al. | 166/254 |
| 4,531,403 | 7/1985 | de Korompay et al. | 73/38 |
| 4,671,379 | 6/1987 | Kennedy et al. | 367/25 |
| 4,779,200 | 10/1988 | Bradbury et al. | 364/422 |
| 4,783,769 | 11/1988 | Holzhausen et al. | 367/35 |
| 4,802,144 | 1/1989 | Holzhausen et al. | 367/35 |

OTHER PUBLICATIONS

E. B. Wiles et al., "Fluid Transients", FEB Press, Ann Arbor, Mich., 1982.
G. R. Holzhausen et al., "Fracture Diagnostics in East Texas and Western Colorado Using the Hydraulic-Impedance Method", May 18–21, 1986, Unconventional Gas Technology Symposium.
G. R. Holzhausen et al., "Impedance of Hydraulic Fractures: Its Measurement and Use for Estimating Fracture Closure Pressure and Dimensions", May 19–22, 1985, SPE/DOE.
Bernard Chouet, "Dynamics of a Fluid-Driven Crack in Three Dimensions by the Finite Difference Method", Dec. 10, 1986, Journal of Geophysical Research, vol. 91, No. B14.
Bernard Chouet, "Ground Motion in the Near Field of a Fluid-Driven Crack and its Interpretation in the Study of Shallow Volcanic Tremor", Jul. 10, 1981 Journal of Geophysical Resch.
A. E. Green et al., "The Distribution of Stress in the Neighborhood of a Flat Elliptical Crack in an Elastic Solid", Cambridge Phil. Soc. Proceedings, vol. 46, pp. 159–163.
T. O. Anderson et al., "A Study of Induced Fracturing Using an Instrumental Approach", Journal of Petroleum Technology, Feb. 1967, pp. 261–267.

*Primary Examiner*—Ian J. Lobo
*Attorney, Agent, or Firm*—Skjerven, Morrill, MacPherson, Franklin & Friel

[57] ABSTRACT

A method of testing a water or petroleum well to obtain information about well features, especially that part of the well beneath the ground surface, is described. The method is especially useful in detecting problems or irregularities in the well such as stuck tools, casing damage, damaged zones in an uncased well, or debris in a well. The method involves creating oscillations in the fluid pressure in the well. Transducers measure the pressure oscillations. The measured pressure oscillations are used to determine resonant frequencies. The measured resonant frequencies are used to determine the characteristic impedance and the depth of each reflector in the well, after removing resonances caused by known reflectors. It is then possible to determine the nature of each unknown reflector based on suspected problems or the well's operational history.

71 Claims, 14 Drawing Sheets

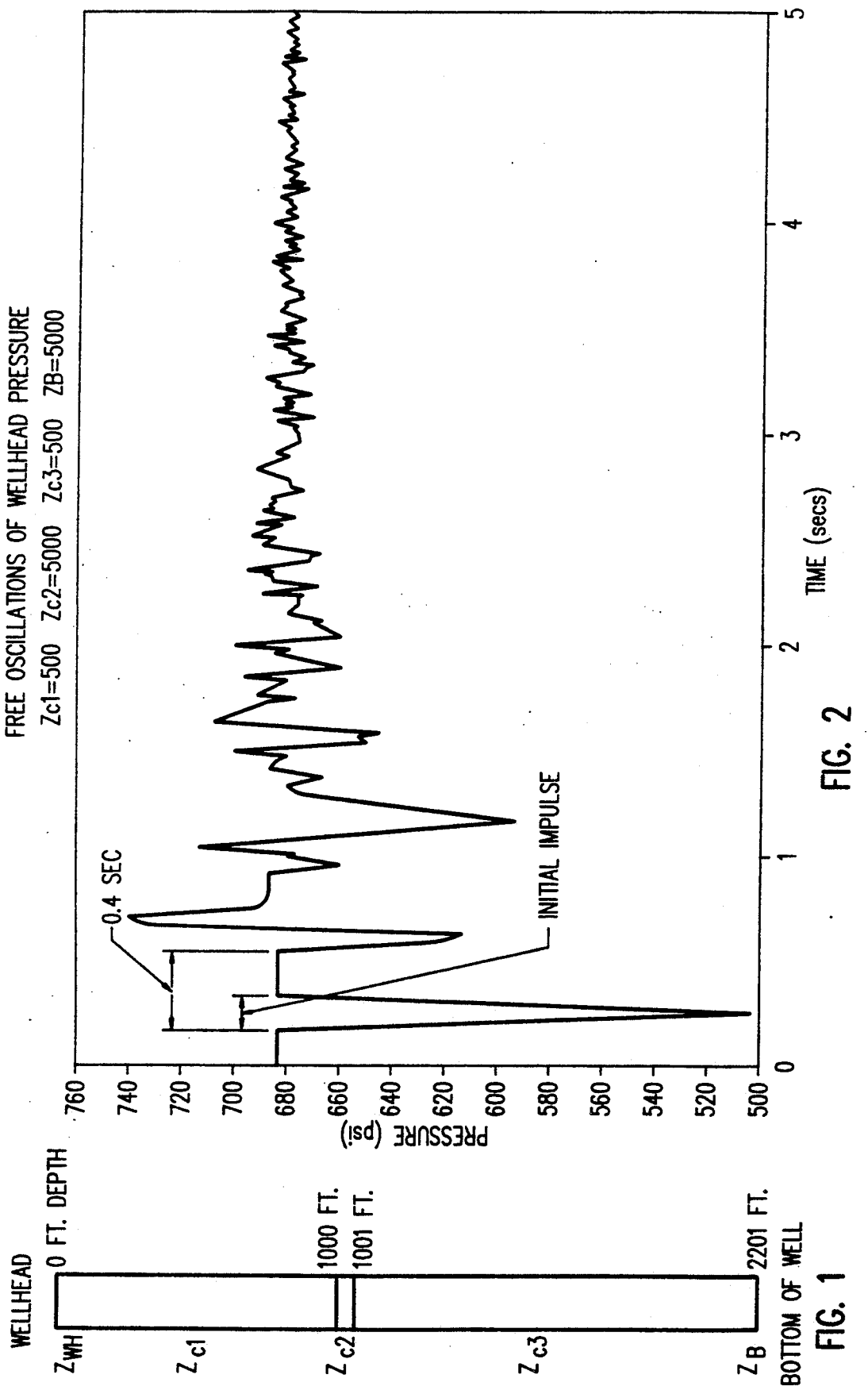

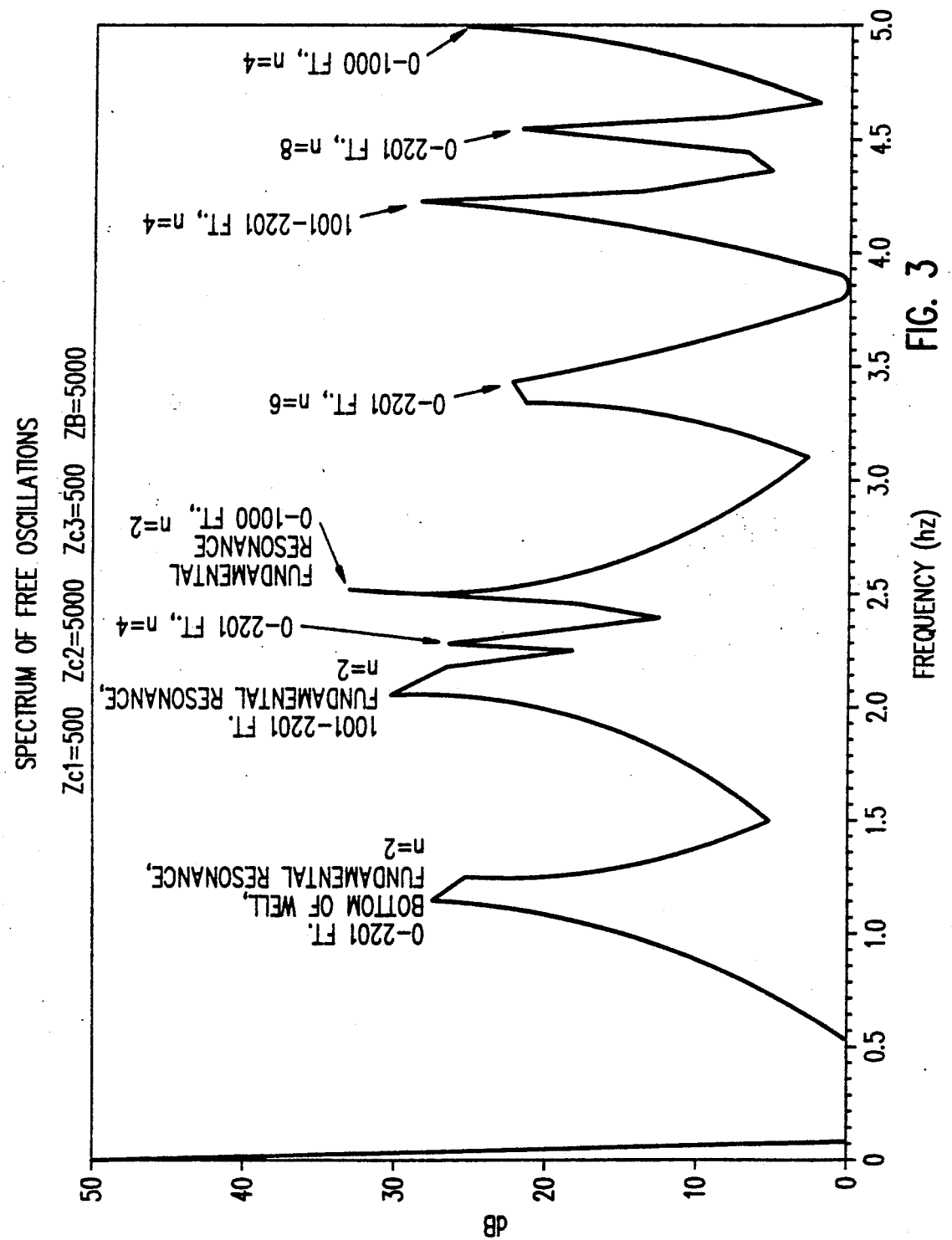

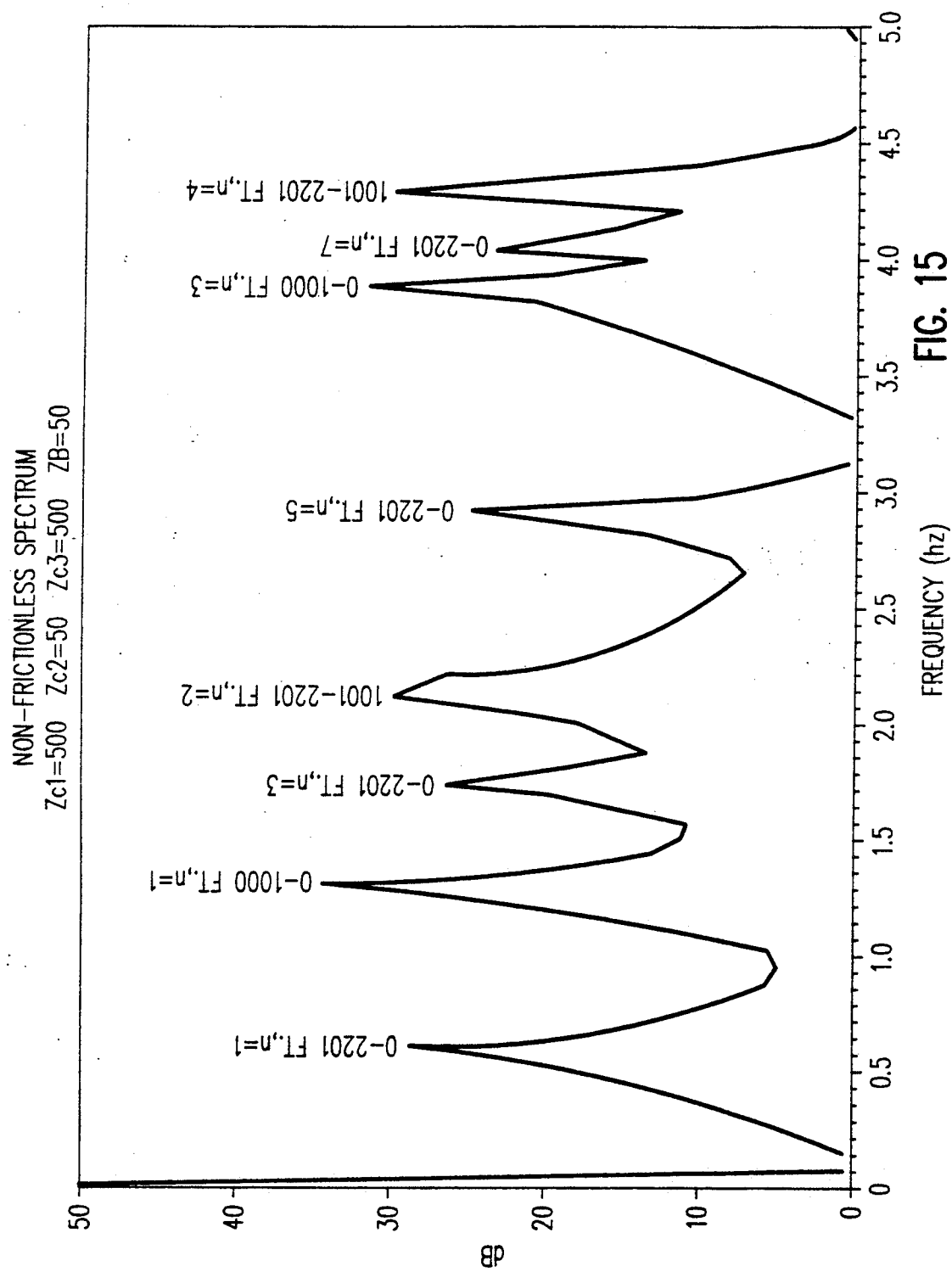

METHOD OF IDENTIFICATION OF WELL DAMAGE AND DOWNHOLE IRREGULARITIES

BACKGROUND OF THE INVENTION

This invention is in the field of petroleum and ground water engineering. More specifically, it is in the field of operation and maintenance of wells, including oil wells, gas wells and water wells of all types.

Some of the problems or irregularities encountered with wells, include, but are not limited to, the following:

Stuck tools or equipment ("fish") in the well.
Closed vs. open perforations.
Casing damage in the form of local collapse or shearing that causes a change in the cross-sectional area Of the well.
Casing damage in the form of corrosion or breakage that causes a widening of the diameter of the interior of the well.
A break in the casing that causes the fluid in the well to be hydraulically coupled with the fluid surrounding and outside of the well.
The contact between two dissimilar fluids in the well, e.g. oil above water.
Zone(s) at which there is no cement bonding the casing to the surrounding formation rock, causing the casing to be more compliant than in other locations where it is supported by cement.
Zones at which fractures or highly permeable material intersect the well.
Zones which, in an uncased well, have been washed out, caved in or otherwise enlarged with respect to the normal well diameter.
The bottom of the open portion of a well that has been partially filled with debris (e.g., sand, mineral scale, pieces of metal). Older methods require the lowering of a wire line into the well to find the bottom. The present method finds the bottom quickly and effectively, without lowering anything into the well.

The prior art methods of dealing with the above listed problems typically include well-known methods such as wireline logging and lowering into the wellbore of special tools to obtain information or samples of materials. All these methods have in common the need to send special equipment down the wellbore, during which time the well must be out of operation. Moreover, with regard to some of these well problems, there is no prior art method to obtain definitive information as to the exact nature or location of the problem. This lack of a definitive method results in an expensive and time-consuming trial-and-error approach to solving some of the typical well problems.

Copending applications Ser. No. 06/841,645 now U.S. Pat. No. 4,802,144, issued Jan. 31, 1989 and, Ser. No. 06/841,644 now U.S. Pat. No. 4,783,769, issued Nov. 8, 1988 describe methods somewhat related to that of the present application. However both these Applications disclose methods for analyzing features external to the well such as hydraulic fractures. In contrast, the present application discloses a method of dealing with features that are in or immediately adjacent to the wellbore.

SUMMARY OF THE INVENTION

The invention consists of a new process for testing a well to obtain information about the physical condition of the interior of the well and areas immediately adjoining the well, particularly the invisible portion beneath the ground surface. The process of the invention obtains this information quickly and reliably. It yields economic benefits to the owner of a well by providing information that can be used to increase well productivity and to avoid or correct well damage. Furthermore, the speed with which the method can be applied minimizes revenue loss from "downtime." That is, the present invention shortens the time a well must be out of operation in comparison with conventional well testing and evaluation methods. The method of the present invention provides information heretofore unavailable to the well owner, increasing his/her alternatives for completing and maintaining the well in a safe and environmentally sound, yet profitable, manner.

The method of the present invention uses the properties of pressure waves traveling in a fluid to evaluate downhole conditions. The low cost and relative ease with which the required pressure waves can be generated, recorded and interpreted are valuable features of the invention.

A great many features of importance cause a downgoing wave to be partially reflected. The method of the present invention locates these features, using the resonant frequencies present in the well. The invention further establishes the relative value of the characteristic impedance at the feature (greater or less than the characteristic impedance of the well). It further provides a process for evaluating the magnitude of the characteristic impedance of the feature using free-oscillation decay rates. It also provides a process for evaluating the hydraulic cross-sectional area or wavespeed of the well at the feature. By the process of elimination, the invention indicates the possible physical explanation for the downhole impedance change, e.g., a stuck tool, a sheared casing, a hole wash out, a bad cement job, a contact between dissimilar fluids in the well, etc.

This process of the invention includes the following steps (some of which may be omitted depending on the application)

1. Positioning one or more transducers in or on the well in order to measure free or forced oscillations of pressure. Normally, these will be pressure transducers. However, the use of accelerometers, strain gauges or velocity transducers (geophones) may in some cases effectively measure the frequency of passing pressure waves and therefore serve as a suitable substitute for, or supplement to pressure transducers.

2. Filling the well with fluid until a positive pressure is attained at all points in the well (positive pressure is a pressure greater than atmospheric).

3. Creating free or forced oscillations of pressure in the fluid in the well. Free oscillations are generated by perturbing the fluid by rapidly opening and closing a valve to release a small amount of fluid, rapidly pressurizing the well using compressed air, or employing other techniques known in the art. Forced oscillations are generated by the cyclic action of a pump or other device that can oscillate the fluid at a point in the well (typically the wellhead) at a controlled frequency.

4. Measuring and recording the resulting pressure oscillations, or the frequency of oscillations, at one or more points in the well.

5. Determining the velocity of pressure waves in the fluid in the well. This is done by using the appropriate equation for wavespeed, as is well known in the art, or by measuring the sonic travel time to and from a reflector at a known distance and dividing this distance by one half the travel time, or by determining the resonant frequency corresponding to a known reflector at a known distance.

6. Determining the resonant frequencies present in the pressure oscillations in the well.

7. Computing the resonant frequencies produced by known features in or near the well at different depths. Such features might include packers, casing diameter changes and the bottom of the well. Separating these frequencies from other "unexpected" resonant frequencies in the well.

8. Determining which of the "unexpected" resonances are related harmonically to one another, i.e., which ones originate from the same reflectors.

9. Determining whether the "unexpected" resonances from each discovered reflector display even or odd harmonics.

10. Using the equations in this disclosure infra, determining the distance from the wellhead to each "unexpected" reflector.

11. For each "unexpected" reflector, determining whether its characteristic impedance is greater or less than that of the wellbore itself (this determination is made by observing whether the harmonics are odd or even).

12. Based on the known history of the well, evaluating the characteristics of the "unexpected" reflector in a manner that will provide diagnostic information about the condition of the well. For example:

If a tool has recently become stuck in the well and a high-impedance reflector has been found, one can reasonably conclude that the depth to this reflector is the depth to the tool.

If wells in a certain vicinity are known to fail by casing narrowing or shearing, and if a high-impedance reflector has been found, one can reasonably conclude that the depth to this reflector is the depth to the point of casing damage.

If the boundary between low-density oil floating on higher-density salt water in a well is sought, and if a low-impedance reflector has been found, one can conclude that this is the depth to the boundary.

If a well has been logged and been found to be in good condition, but it is suspected that a section of casing has no cement behind it, the method of the invention can be used to find this section by finding a low-impedance reflector.

13. Determining the magnitude of the characteristic impedance of the downhole feature from the decay rate of free oscillations from the feature.

14. Estimating the hydraulic cross section or wavespeed at the feature from the magnitude of the feature's characteristic impedance.

The invention therefore deals with the use of the resonant properties of a well (oil, gas, brine or other chemical solutions, or water) to locate and evaluate downhole features critical to the safe and profitable operation of a well. It is the novel use of the principles of resonance in a practical testing process that distinguishes this invention from the prior art. The significant and novel aspects of this invention include at least the following:

1. Systematically using the resonant properties of a well to characterize well features. This is a great advance over conventional methods, which rely on time-consuming and expensive wireline logging methods and diffusive pressure analysis (e.g. pressure transient analysis).

2. Differentiating features of interest from known features that are not of interest. This is done by separating and identifying the various resonant frequencies present in any well. The known resonances are then discarded. The remaining resonances are analyzed to obtain the needed information.

3. Distinguishing high-impedance from low-impedance features. This allows differentiating a well enlargement from a well narrowing, a stuck tool from a poorly cemented section of casing, an oil-water contact from a section of well narrowed by a coating of scale, etc.

4. Evaluating the cross-sectional area or the wavespeed characteristics of downhole features.

5. A full methodology which includes how to acquire the data and how to interpret the data.

6. A methodology usable whether the bottom of the well is open, closed, or partially open, or whether the wellbore is cased, uncased, or partially cased, or whether the wellhead is open, closed, or partially open.

7. A methodology usable with both liquid and gas-filled wells.

8. A methodology usable with wells filled with a plurality of fluids such as oil and water.

DESCRIPTION OF THE DRAWINGS

FIG. 1 shows a schematic view of a well.

FIG. 2 shows a wellhead pressure plot, for the case where the wellhead and bottom of the well are closed and there is a reflection point in the well having a characteristic impedance greater than that of the well.

FIG. 3 shows a frequency domain plot of the data of FIG. 2, versus decibels.

FIG. 15 shows a frequency domain plot versus decibels of the data in FIG. 14.

DETAILED DESCRIPTION OF THE INVENTION

Basic Concepts

Figure 4:
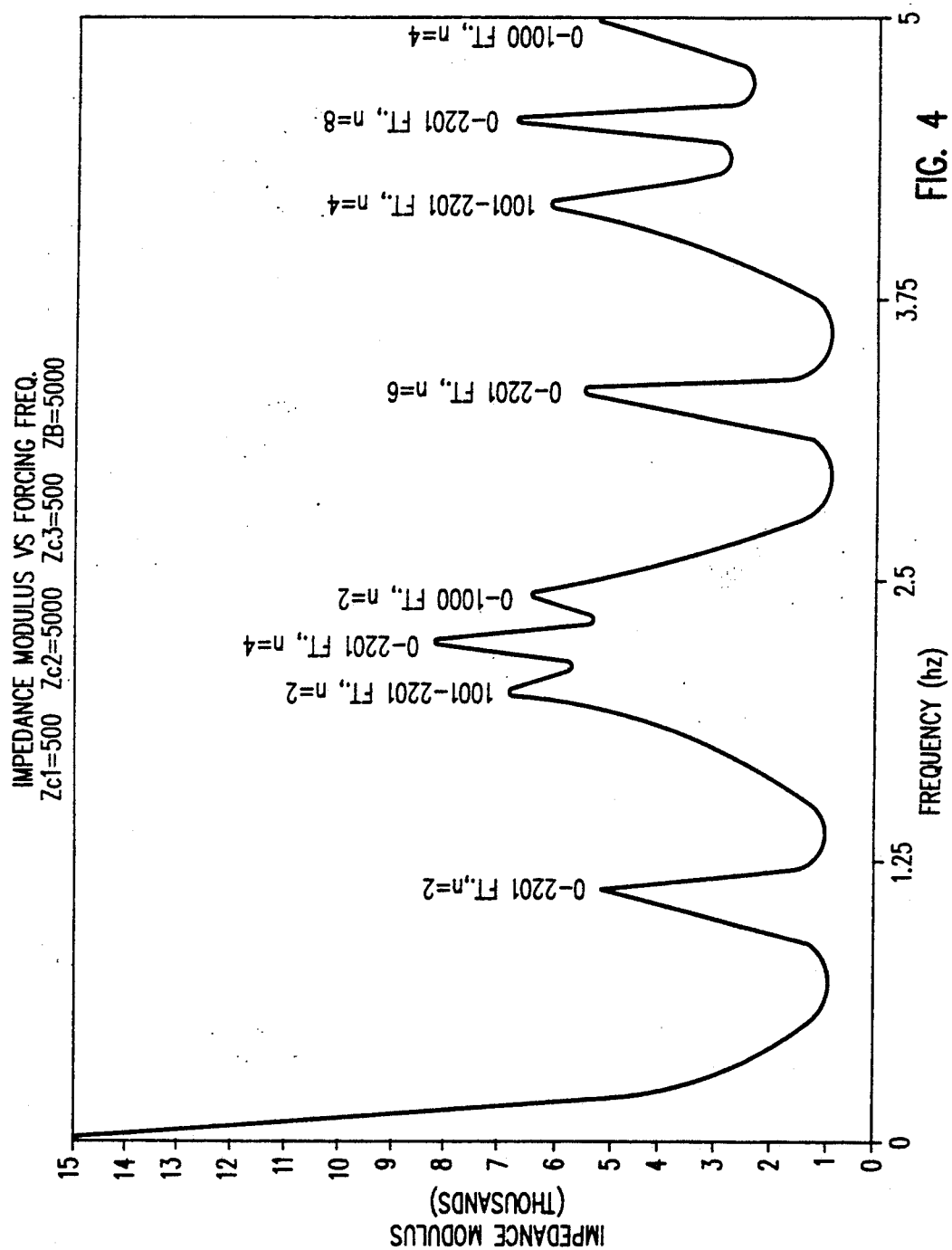
FIG. 4 shows a frequency domain plot of wellhead impedance for forced oscillation.
Figure 5:
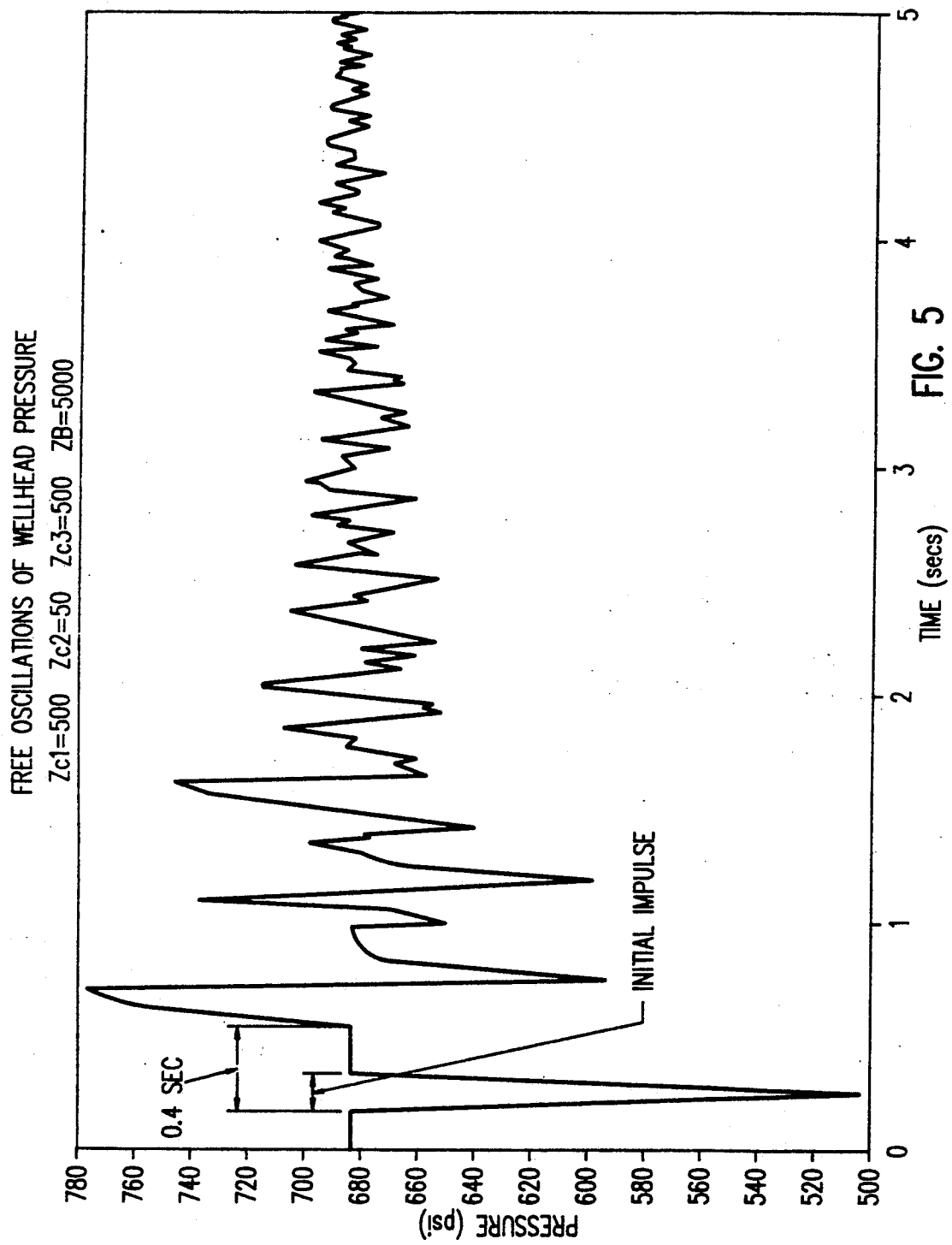
FIG. 5 shows a wellhead pressure plot, for the case where there is a reflection point in the well having a characteristic impedance lower than that of the well.
Figure 6:
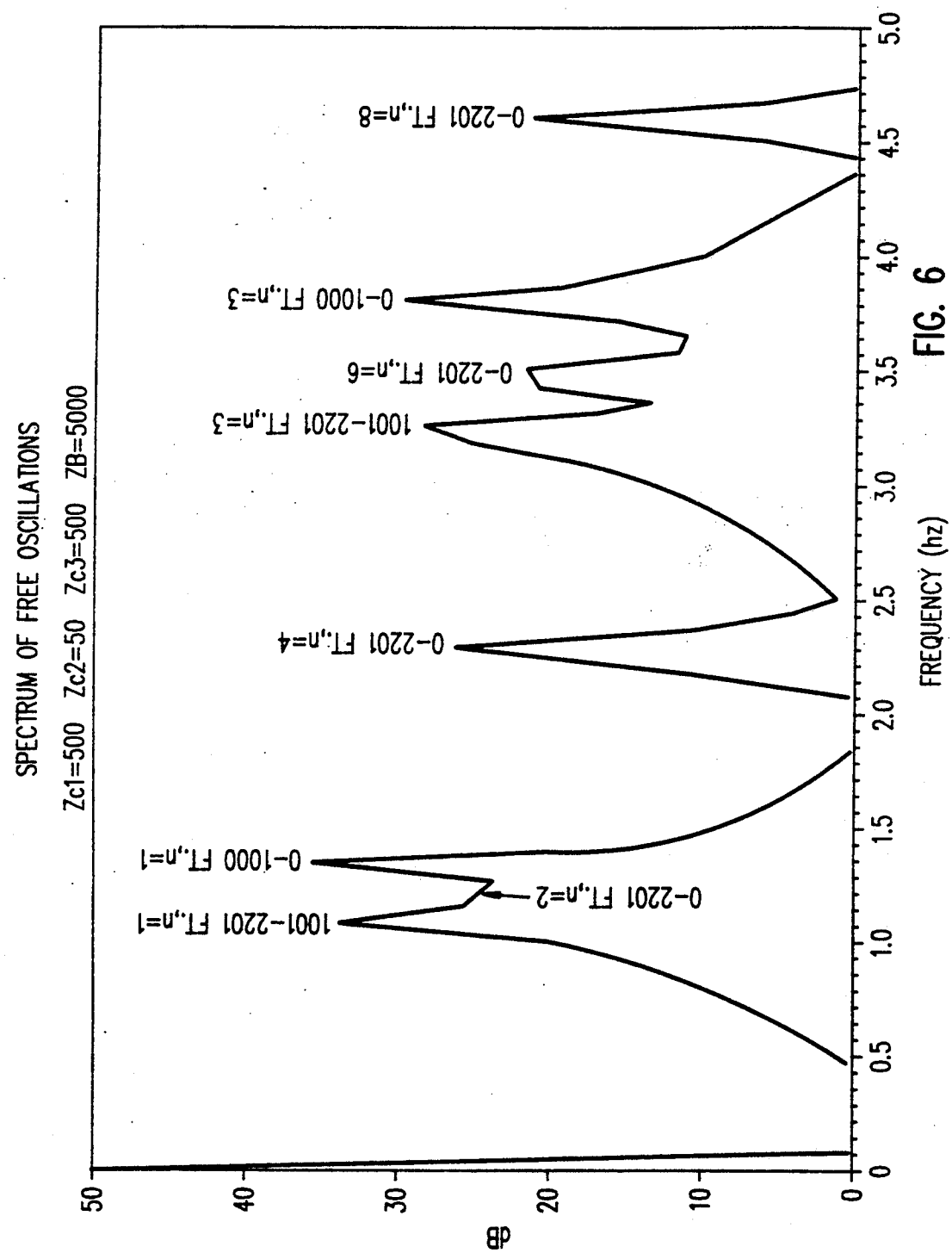
FIG. 6 shows a frequency domain plot of the data of FIG. 5, versus decibels.
Figure 7:
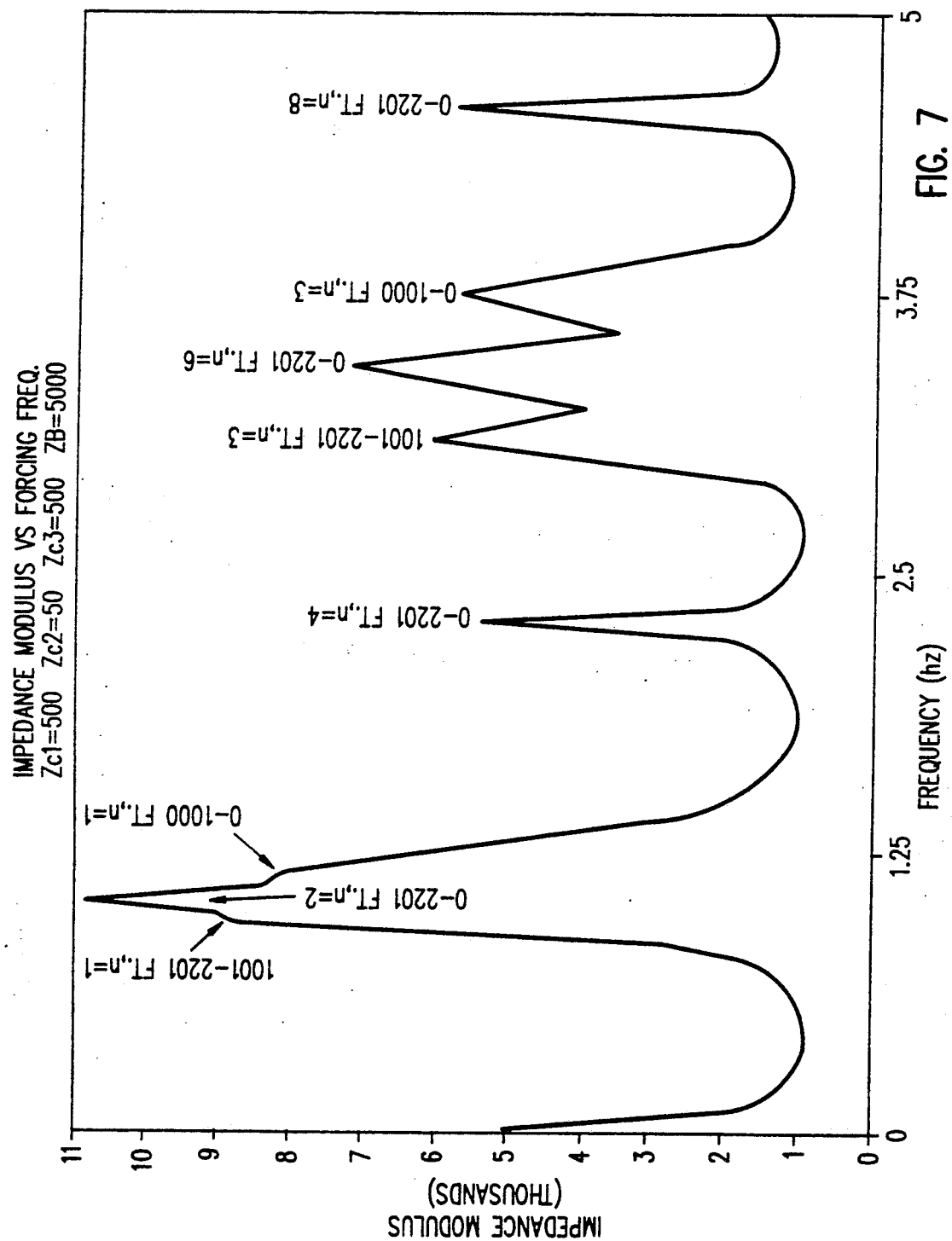
FIG. 7 shows a frequency domain plot of wellhead impedance for forced oscillations, for the case shown in FIG. 5.

A liquid-filled or gas-filled well is a fluid system. An impulse generated in the fluid in a well creates a pressure wave (also referred to as a sound wave or a sonic wave) that travels through the fluid in the well until it encounters an impedance change in the well, where it is wholly or partially reflected. The most common sources of impedance change are changes in the cross-sectional area of the well or changes of the wavespeed in the fluid in the well. In the cases of a constant pressure boundary or a zero flow boundary in the well (typically at the bottom) the reflection is total except for possible frictional and elastic losses into the casing and surrounding rock. In all other cases, there is a partial reflection, with part of the wave continuing in the original propagation direction and part being reflected back toward the point of origin.

A reflected wave returns in the direction of its origin. If the origin was at the wellhead, the reflected wave will soon arrive back at the wellhead, where it again encounters an impedance change and is again reflected. Upon reaching the original downhole reflection point, the wave once again is reflected toward the wellhead. This propagation-reflection process continues in this manner until the wave is fully damped by energy losses at partial-reflection points and by frictional and elastic losses into the surrounding solid media. Because the velocity of the wave is the same each time it traverses the well between the two reflection points, the travel time between the points is proportional to the distance between them. If the pressure is recorded as a function of time at any point in the well, the pressure will be seen to fluctuate periodically as the wave passes by the recording point. The frequency of these fluctuations is therefore inversely proportional to the distance between the two reflection points.

The frequencies at which pressure oscillations occur in a well that is perturbed with a sudden impulse are termed the resonant frequencies of the well. The resonant behavior of a pressurized fluid-filled wellbore is determined by the location of reflectors in the well, and also by the elastic properties of the well casing and surrounding rock, and by the rheology of the fluid in the well. Resonant behavior changes whenever the characteristics of the wellbore change, either intentionally or through unforeseen problems. Problems can range from bad cement jobs to stuck downhole tools. One can, however, predict the resonant behavior of a wellbore with known geometry. Deviations from this predictable behavior can therefore be assigned to deviations in the known well characteristics, especially the presence of new or unexpected downhole reflectors. These deviations are used in the method of the present invention to determine the depths in the well of the downhole features that correspond to these reflectors. They are further used to differentiate one type of reflector from another.

To understand the method of the present invention, it is useful to review the hydraulic principles of resonance that describe the resonant behavior of a well or pipeline. In the following paragraphs are presented these principles for the cases of free oscillation and forced oscillation, both of which are used in the present invention.

DEFINITIONS OF IMPEDANCE

The concept of hydraulic impedance is useful for describing wave propagation and reflection in a well. Hydraulic impedance Z is a complex-valued variable which is defined for any point, x, in a pipe. It expresses the relationship between the oscillatory hydraulic head H and flow Q at that point:

$$Z(x) = \frac{H(x)}{Q(x)} e^{i\omega\phi} \quad (1)$$

where $i=\sqrt{-1}$, $\omega$ is the circular frequency in radians per second and $\phi$ is the phase difference in seconds between head and flow (see "Impedance of Hydraulic Fractures:..." by G. R. Holzhausen and R. P. Gooch, SPE/DOE 13892, Soc. Petr. Eng. & DOE Joint Symposium on Low Permeability Reservoirs, Denver, May 1985; and "The Effect of Hydraulic Pressure Growth on Free Oscillation of Wellbore Pressure" by G. R. Holzhausen and R. P. Gooch, Proceedings of 26th U.S. Symp. on Rock Mechanics, Rapid City, S.D., pages 621-631, June, 1985; and *Fluid Transients*, E. B. Wiley and V. L. Streeter, FEB Press). Note that head H is related to pressure P by the formula $P=\rho gH$ where $\rho$ is fluid mass density and g is gravitational acceleration. Frequency $\omega$ is related to frequency f (cycles per second, or hertz) and to wave period W as follows: $f=\omega/2\pi$ and $W=2\pi/\omega=1/f$.

Another useful definition is the property known as characteristic impedance. Characteristic impedance $Z_c$ is a property of any uniform hydraulic conduit. In the most general sense, it can be written as (Wiley and Streeter, 1982):

$$Z_c = \frac{\gamma}{Cs} \quad (2)$$

which is a function of the propagation constant $\gamma^2$, $$\gamma^2 = Cs(Ls + R) \quad (3)$$

the resistivity R, or frictional resistance per unit length of conduit, $$R = \frac{32\nu}{gAD^2} \quad (4)$$

the fluid capacitance C, $$C = \frac{gA}{a^2} \quad (5)$$

and fluid inertance L, $$L = \frac{1}{gA} \quad (6)$$

The complex frequency, s, is defined as $\alpha+i\omega$. The real part of s, $\alpha$, indicates the rate of decay of the amplitude of oscillations. The imaginary part $\omega$ determines the frequency of oscillations. Other variables in the equations above are fluid wavespeed a, kinematic viscosity $\nu$, the fluid-filled cross-sectional area of the pipe A (referred to as "hydraulic cross section" elsewhere in this disclosure) and hydraulic diameter D.

In a typical wellbore R<<L, so that the role of friction in determining the nature of resonance is negligible. For example, in a well filled with water at a temperature of 70° F., R=0.00015 sec/ft$^3$ while L=0.075 sec$^2$/ft$^3$. Thus, resistivity may be set to zero above, allowing simplified expressions for $\gamma$ and $Z_c$:

$$\gamma = \frac{s}{a} \tag{7}$$

[No Equation 8] (8)

$$Z_c = \frac{a}{gA} \tag{9}$$

Thus, for practical considerations, characteristic impedance in a section of a well is determined by the fluid wavespeed and diameter in that section.

CONTROL OF WAVE REFLECTION BY CHARACTERISTIC IMPEDANCE

It is known in hydraulics (Wiley and Streeter, 1982) and also in electrical transmission line theory (*Electromagnetic Wave Propagation*, D. W. Dearholt and W. R. McSpadden, McGraw-Hill, 1973) that changes of characteristic impedance within a pipe or in a transmission line cause reflections of oscillatory energy. The amount of the energy in a pressure wave that is reflected, and the amount that is transmitted past the reflection point, are determined by the reflection and propagation coefficients. These coefficients are defined by the characteristic impedances of the section pipe on opposite sides of the reflection point. For a wave travelling down pipe section 1 toward pipe section 2, the reflection coefficient r is:

$$r = \frac{Z_{c2} - Z_{c1}}{Z_{c2} + Z_{c1}} \tag{10}$$

and the propagation coefficient p is:

$$p = \frac{2Z_{c2}}{Z_{c2} + Z_{c1}} \tag{11}$$

The reflection coefficient is the ratio of the amplitude of the reflected wave to that of the incident wave. The propagation coefficient is the ratio of the amplitude of the wave propagated beyond the reflection point to the amplitude of the incident wave. Excluding losses from fluid friction and elastic wave propagation through the casing, the sum of the reflected and the transmitted waves is equal to the amplitude of the initially incident wave.

It is seen from these last two equations and from the simplified equation for characteristic impedance that the amount of energy reflected and propagated is highly dependent on fluid wavespeed and cross-sectional areas in adjacent sections of pipe. These parameters determine not only the amount of energy reflected, but also whether it will be reflected with a positive or negative sign. If the second section of pipe has a larger diameter or a slower wavespeed than the first, a wave front encountering the boundary will be reflected back up pipe 1 with a negative rather than a positive amplitude. A cross-sectional area reduction in pipe section 2, with no wavespeed change, produces a positive reflection. Thus, a tool stuck in the well will produce a positive reflection because it reduces the cross-sectional area of the fluid in the well. Similarly, kinking, shearing or other deformation of the well casing that serves to reduce the area will produce a positive reflection of a wave traveling in the well. Buildup of minerals (scale) on the inside of a well casing will also narrow the diameter and produce a positive reflection. On the other hand, a widening caused by severe corrosion of a section of the casing will produce a negative reflection. Similarly, if a well is uncased and a section of softer material has washed away, giving that section a larger diameter, a negative reflection will also be produced.

EFFECTS OF DOWNHOLE IRREGULARITIES ON WAVESPEEDS IN WELLS

Fluid wavespeed in a confined conduit, such as a well, is determined primarily by the bulk modulus and density of the fluid and by the compressibility of the conduit. Conduit compressibility is primarily a function of the elastic modulus of the conduit material, the wall thickness of the pipe and whether or not it is cemented to and supported by the surrounding rock material. The degree to which the pipe can expand longitudinally is also a factor in determining wavespeed.

Equations for computing wavespeed are well known in the art and can be found in *Waterhammer Analysis*, John Parmakian, Dover, 1963, Chap. III and Wiley and Streeter, 1982. For purposes of demonstrating the method of the present invention below are presented wavespeed equations for boundary conditions typically found in oil, gas and water wells. The invention is not limited, however, to the specific boundary conditions represented by the following wavespeed equations.

In general, the equation for wavespeed a in a pipe or well casing is:

$$a = \sqrt{\frac{1}{\frac{\omega}{g}\left(\frac{1}{K} + \frac{dc}{Ee}\right)}} \tag{12}$$

where d is pipe diameter, e pipe wall thickness, E Young's modulus of the pipe wall material (typically on the order of 4.32×10$^9$ pounds per square foot (psf) for steel), K bulk modulus for the fluid in the well (about 43.2×10$^6$ psf for water), $\omega$ the specific weight of the fluid (about 62.4 pounds per cubic ft. for water) and $\mu$ Poisson's ratio of the pipe wall material (about 0.3 for steel). The term c is a coefficient that depends on the elastic boundary conditions of the well.

When the pipe or casing is fixed at the upper end but not the lower end, and is not cemented to the surrounding rock (this is commonly the case for a tubing string in a well):

$$c = \frac{5}{4} - \mu \tag{13}$$

For a well casing or tubing string that is supported at both ends so that it cannot move longitudinally, but that is not cemented to the formation between these support points, $$c = 1 - \mu^2 \tag{14}$$

For a well casing that is cemented uniformly to the rock around it (the rock having the shear modulus G)

$$c = Ee/(Gd + Ee) \tag{15}$$

Finally, wavespeed a in an uncased well is given by the equation $$a = \sqrt{\frac{1}{\frac{\omega}{g}\left(\frac{1}{K} + \frac{1}{G}\right)}} \quad (16)$$

Reflections caused by wavespeed contrasts reveal many important features within a well. For example, the contact between two liquids of different densities in a well, such as a column of oil floating on a column of water, produces a reflection because of a wavespeed contrast. The quality of the cement bond between casing and the surrounding rock formation is an important question in the petroleum and ground water engineering. The unexpected absence of a cement bond because of a poor cementing treatment is a common cause of expensive problems. These problems range from failed hydraulic-fracturing treatments (fracturing fluid flows up the casing-formation annulus rather than into a fracture) to contamination of ground water supplies by the migration of salt water brines along the open annular space between the casing and the rock. Various well logging techniques have been developed to evaluate cement bond quality, but they are expensive and time-consuming to perform. Comparing equation 13 to equation 15 above reveals that the wavespeed in an uncemented section of a cased well is slower than in a section that is cemented to the surrounding rock. Thus, a wave traveling down a well in which the casing is firmly bonded to the surrounding rock will undergo a negative partial reflection when it enters a portion of the well without cement behind the casing. This effect is extremely useful for identifying intervals lacking in cement before problems develop at a later date.

USE OF FREE OSCILLATIONS OF PRESSURE TO LOCATE AND EVALUATE DOWNHOLE FEATURES

When the pressurized fluid in a well is abruptly perturbed, the resulting pressure oscillations occur at the resonant frequencies of the well. The downhole features that one wishes to locate are points of characteristic impedance contrast. The locations of these features determine some of the resonant frequencies that are present in the well. To develop the procedure for locating these features using free-oscillation behavior, one begins with the well-known hydraulic transfer equations (Wylie and Streeter, 1982);

$$H_D = H_U \cosh(\gamma l) - Q_U Z_c \sinh(\gamma l) \quad (17)$$

$$Q_D = Q_U \cosh(\gamma l) - \frac{H_U}{Z_c} \sinh(\gamma l) \quad (18)$$

where l is the length of a uniform section of well or pipe, and the U and D subscripts refer to upstream (wellhead) and downstream reflection points, i.e., points where there is a change of characteristic impedance. If the well consists of a single uniform section of pipe, then the U and D subscripts refer to the wellhead and the bottom of the well respectively. If the well consists of two or more different sections, then the U and D subscripts refer to the upstream and downstream end of a particular section. These expressions use the characteristic impedance of the pipe to express the relationship between the head and discharge of one end of a pipe section to the head and discharge at the other end.

For demonstration purposes, let the boundary condition at the upstream end of a section of well be zero flow (zero discharge). This condition describes a closed wellhead, for example. The same approach as followed below can be applied when the wellhead is open or partially open, allowing some flow in or out of the well. The methodology of the necessary mathematical derivations for each of these cases is well known in the art. For a zero-flow upstream boundary $$Q_U = 0 \quad (19)$$

The downstream boundary condition is specified for the most general case as the hydraulic impedance at the downstream terminus $$Z_D = \frac{H_D}{Q_D} \quad (20)$$

The combination of equations 17 through 20 yields the relation $$Z_D \sinh(\gamma l) + Z_c \cosh(\gamma l) = 0 \quad (21)$$

or if put in exponential form $$e^{2\gamma l}(Z_c + Z_D) + (Z_c - Z_D) = 0 \quad (22)$$

The real part of this equation is $$(e^{2\alpha l/a})\cos\left(\frac{2\omega l}{a}\right) = \frac{Z_D - Z_c}{Z_D + Z_c} \quad (23)$$

The imaginary part of this equation is $$\sin\left(\frac{2\omega l}{a}\right) = 0 \quad (24)$$

The values of $\omega$ which satisfy equation 24 define all the possible free-oscillation frequencies that may occur in the wellbore. Two sets of solutions for equation 22 exist, they are:

for $Z_D < Z_c$ $$\alpha = \frac{a}{2l} \ln\left(\frac{Z_c - Z_D}{Z_c + Z_D}\right) \quad (25)$$

[No Equation 26] (26)

$$\omega = \frac{n\pi a}{2l} \quad n = 1,3 \quad (27)$$

and for $Z_D > Z_c$ $$\alpha = \frac{a}{2l} \ln\left(\frac{Z_D - Z_c}{Z_D + Z_c}\right) \quad (28)$$

[No Equation 29] (29)

$$\omega = \frac{n\pi a}{2l} \quad n = 2,4 \quad (30)$$

In practice, $\omega$ can be determined easily from a record of free oscillations of pressure at the wellhead. To do this, the pressure data is transformed into the frequency domain using a Fast-Fourier-Transform (FFT) algorithm or another time-domain-to-frequency-domain conversion, as is common in the art. The output of the FFT gives the distribution of power in the frequency domain. When plotted, this output has distinct peaks in various parts of the spectrum which correspond to the resonant frequencies of the well.

With the method of the present invention an observation of the frequency spectrum allows an immediate interpretation of the location and nature of a downhole reflector. If odd harmonics are observed ($n=1,3\ldots$) this indicates that the hydraulic impedance at the reflector is less than the characteristic impedance of the wellbore. Even harmonics ($n=2,4\ldots$) indicate that the impedance of the downhole reflector is greater than the wellbore's characteristic impedance. If the change is solely the result of a change in casing diameter, and the free oscillation frequencies are odd harmonics, equation 27 indicates that the casing diameter increases at the reflector. In contrast, even harmonics indicate a decreasing casing diameter.

The distance between the wellhead and the downhole reflector is determined directly from the measured frequencies of free oscillation using equation 27 or 30, as appropriate. First, the harmonic number n is selected from an inspection of the data, then the frequency $\omega$ and wavespeed a are substituted into the appropriate equation. The depth to the reflection point 1 is then computed.

In using the method of the present invention it is necessary to differentiate resonances produced by the downhole features under investigation from resonances that would otherwise occur in the well. The strongest resonances in most wells are caused by reflections off the bottom of the well. Because the depth to the bottom is known in most cases, the resonances caused by the bottom are easily computed using equations 27 or 30. If the bottom is a dead end, i.e., a no-flow boundary, equation 30 is used to compute its resonant frequencies $\omega$. If it is a constant pressure boundary (at least during the period over which the measurements are made, normally several seconds), equation 27 is used to compute the frequencies $\omega$. This procedure of computing depth to the bottom is explained more fully in copending U.S. patent application Ser. No. 06/841,645 now U.S. Pat. No. 4,802,144, issued Jan. 31, 1989 and Ser. No. 06/841,644 now U.S. Pat. No. 4,783,769, issued Nov. 8, 1988. Other known features in a well, such as a small-diameter "nipple" or a small-diameter casing liner, can be identified in the same manner and thereby differentiated from unknown features under investigation.

FIGS. 1-13 illustrate the use of the method of the present invention for location of a downhole impedance contrast and the differentiation of this contrast from the harmonics caused by wave reflection at the bottom of the well. FIG. 1 shows a well (total depth=2201 ft.) in which there is a characteristic impedance contrast at a depth of 1000 to 1001 feet. Otherwise, the well is of uniform characteristic impedance over its entire depth. FIGS. 2, 3 and 4 show pressure oscillations and resonant behavior for the case in which the wellhead and the bottom of the well have much higher impedances than the characteristic impedance of the well itself. Both are effectively no-flow boundaries and the characteristic impedance $Z_{c2}$ of the short central section is also greater than the characteristic impedance ($Z_{c1}=Z_{c3}$) of the rest of the well. FIG. 2 shows the pressure oscillations that occur at the wellhead after the well is perturbed with an initial impulse. FIG. 3 is a frequency domain plot of the pressure data in FIG. 2, showing the resonant peaks from the bottom of the well and from the reflector at 1000 ft. In FIG. 3 the resonances from the bottom of the well are clearly visible. The lowest-frequency peak ($n=2$) is the fundamental frequency of the entire length of the well. Its higher-order harmonics ($n=4,6,8$) are also clearly visible in FIG. 3. If it is desired to find the hydraulic bottom of a well that had been partially filed with debris, one substitutes the frequencies of these peaks along with their harmonic numbers n and the fluid wavespeed into equation 30, solving for the well depth l. However, if one is looking for the depth of the impedance contrast in the well, first one removes the resonances caused by the bottom of the well from further consideration. Then one processes the remaining resonant frequencies.

Taking the wavespeed for the well as 5000 ft/sec, it is found that the lowest frequency from the reflector is 2.5 hz, corresponding (from equation 30, setting $n=2$) to a reflector depth of 1000 ft. Note that there is a lower frequency at 2.08 hz, which results from resonance between the reflector and the bottom of the well. Solving for the length of well l in which the 2.08 hz resonance occurs (using equation 30 and setting $n=2$ and $\alpha=5000$ ft/sec), it is found that $l=1200$ feet, which is exactly the distance between the reflector and the bottom of the well. From the frequency information alone one can say with certainty that the reflector is either 1000 ft. deep or 1200 ft deep.

It is possible now to conclusively establish reflector depth by examining the time series plot of pressure oscillations (FIG. 2). The first perturbation of the wellhead pressure after the initial impulse comes from the wave reflected up from the point of impedance contrast in the well. By measuring the time between the start of the initial impulse and the arrival of the reflection, one can find the depth to the reflection point. From FIG. 2 it is seen that this time is 0.4 seconds. The two way travel distance (down and back) is 0.4 $seconds \times 5000$ $ft/sec = 2000 ft$. The distance to the reflection point is therefore one-half this amount, or 1000 feet.

Now consider a well in which the reflection point in the middle has a lower characteristic impedance than the rest of the well. Again, the boundary condition at the wellhead and at the bottom is highly restricted flow or no flow. The first reflection, arriving at the wellhead after the initial negative impulse, is positive (FIG. 5) rather than negative as was the case in FIG. 2. This behavior is consistent with a reflection coefficient with a value between 0 and $-1$, as predicted by equation 10. The corresponding frequency domain plot (FIG. 6) reveals even harmonics from the bottom of the well as in the previous example. The fundamental harmonic (n $=2$) from the 2200 ft. depth is masked by the fundamental harmonics associated with resonances above and below the reflector, but the $n=4,6$, and 8 harmonics are clearly visible. Likewise the odd $n=1$ and $n=3$ harmonics from the resonances above and below the reflector are distinct and allow evaluation of the depth of this reflector. Using equation 27, the two possible depths to the reflector (1000 ft. and 1200 ft.) are quickly evaluated. The fact that the reflection point produces odd harmonics also reveals that it is a point of lower characteristic impedance than the rest of the well. This information indicates that the reflection point is a probable area of reduced wavespeed or greater diameter in the well. As in the previous example one measures the time between the start of the initial impulse and the arrival of the reflection to unambiguously define the depth to the reflection point. One finds from FIG. 5 that this time is 0.4 seconds. The two way travel distance (down and back) is 0.4 *seconds*×5000 *ft/sec*=2000 *ft*. The distance to the reflection point is therefore one-half this amount, or 1000 feet.

Figure 8:
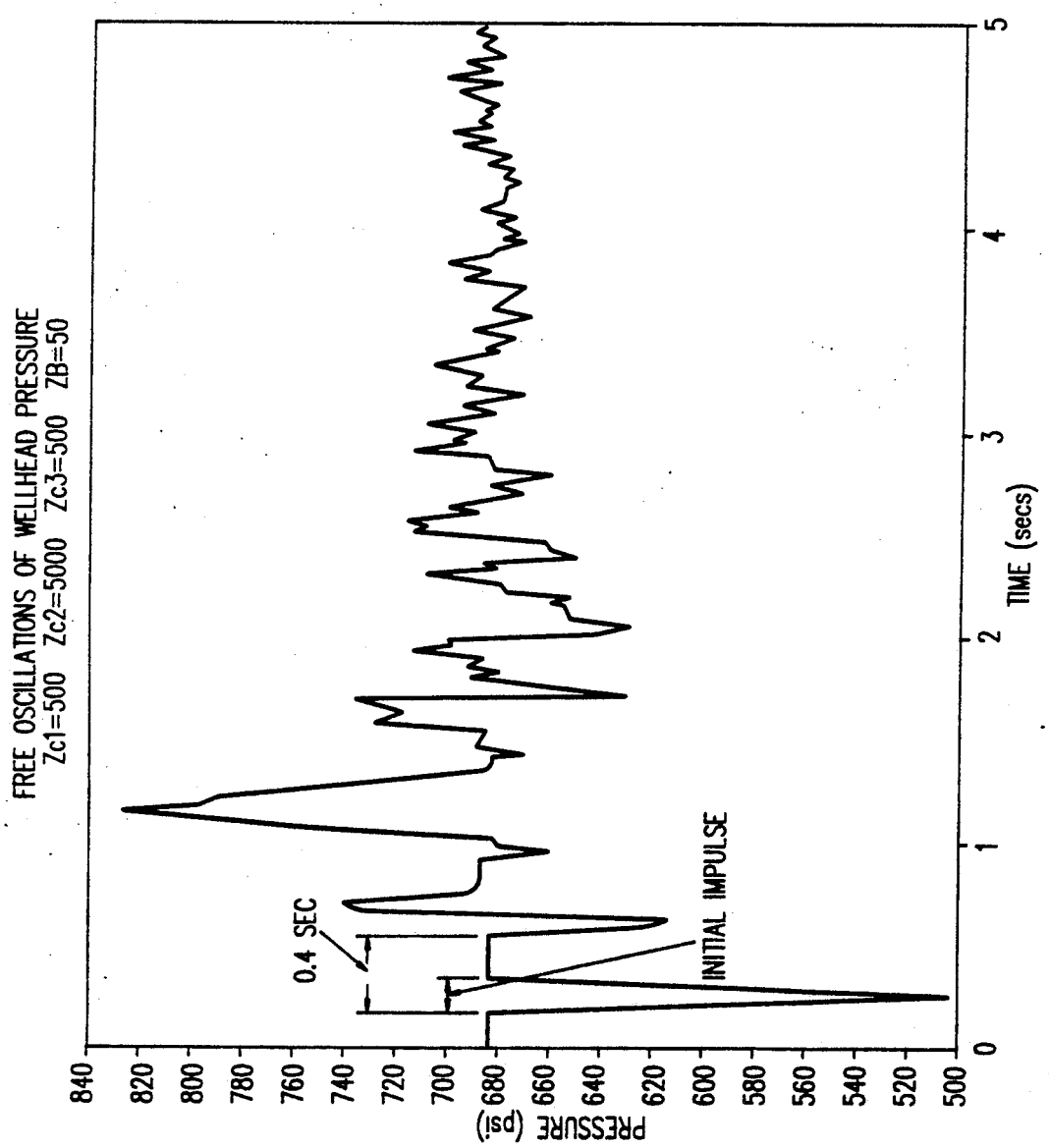
FIG. 8 shows a wellhead pressure plot for the case where the bottom of the well is open and there is a reflection point in the well having a characteristic impedance greater than that of the well.
Figure 9:
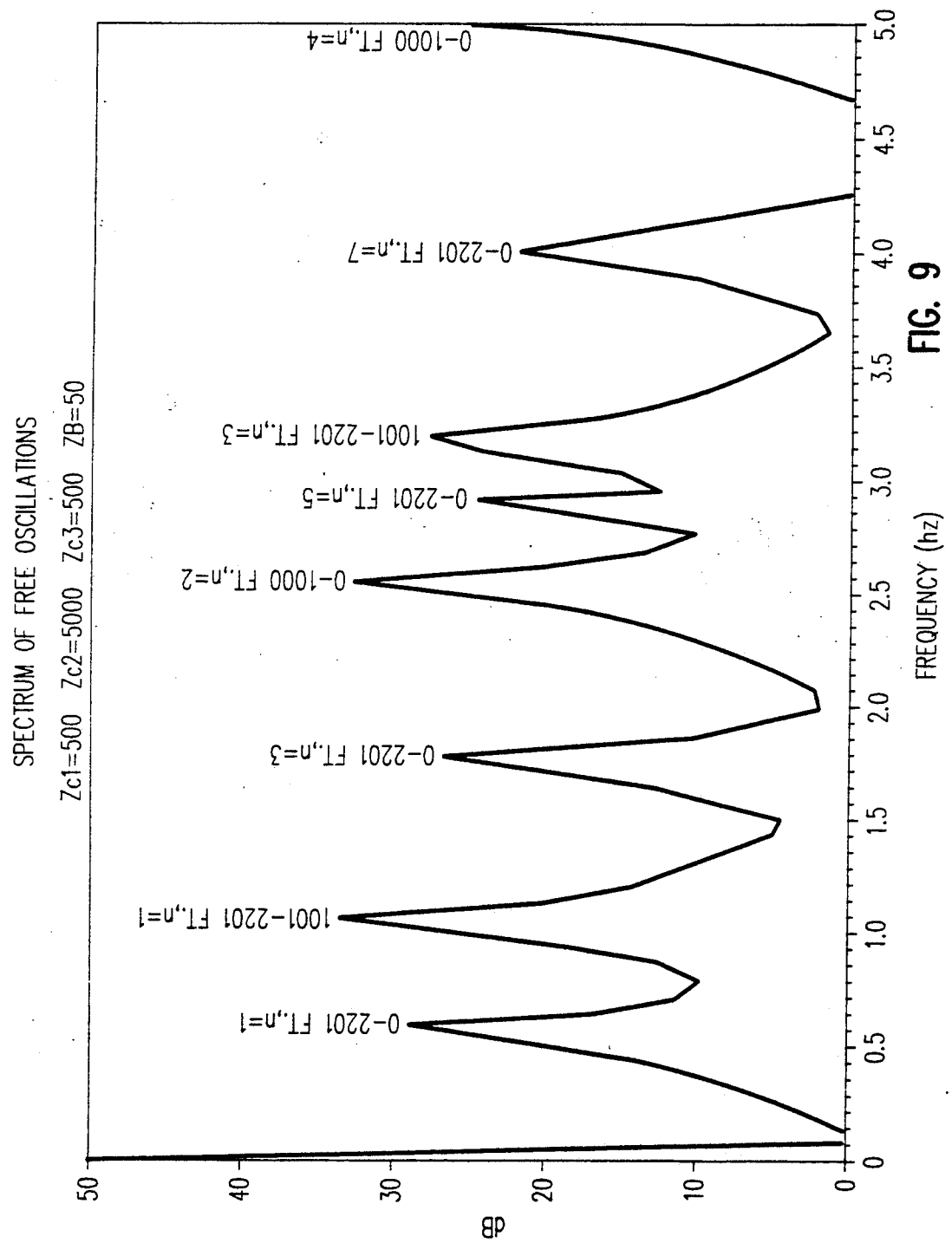
FIG. 9 shows a frequency domain plot versus decibels of the data in FIG. 8.
Figure 10:
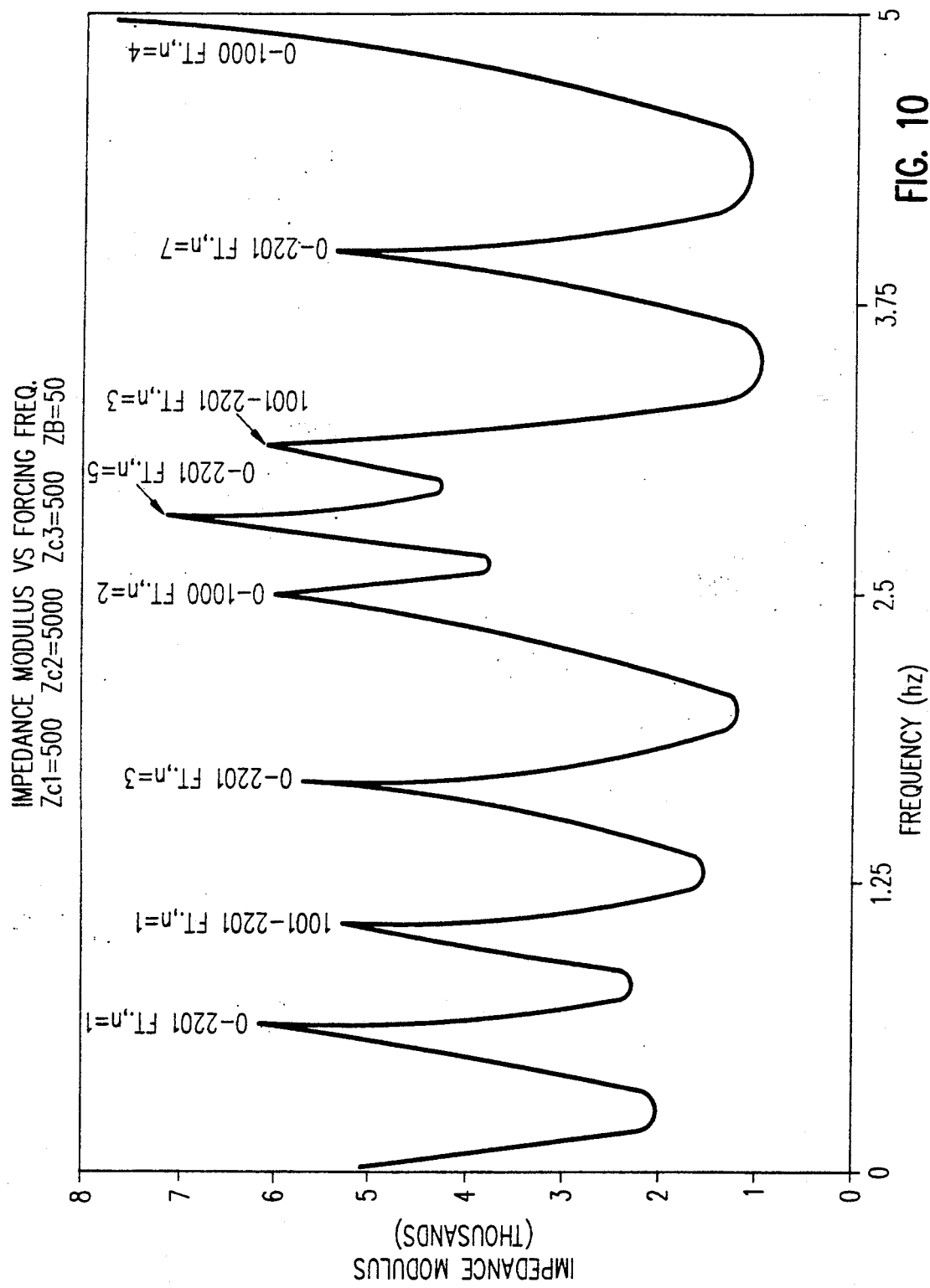
FIG. 10 shows a frequency domain plot of wellhead impedance for forced oscillations, for the case shown in FIG. 8.

Now consider a well as in FIG. 1 in which the bottom is a constant-pressure boundary rather than a no-flow boundary, i.e., $Z_D$ at the bottom of the well is close to zero. FIGS. 8 and 9 show the pressure oscillations and resonant frequencies that result from impulsive excitation of such a well. As predicted by equation 27, the reflection off the bottom of the well now produces odd harmonics with a fundamental frequency of 0.57 hz. This frequency and the n=3,5, and 7 harmonic resonances clearly show up in the frequency domain plot (FIG. 9). The other resonances are in the section of the well above the reflector and the section below the reflector. The 1200-ft. section produces odd harmonics and the 1000-ft. section produces even harmonics, both of which are shown clearly in FIG. 9. To determine which of these depths is the depth from the wellhead to the reflector, one refers to the pressure oscillation plot (FIG. 8). As in the previous examples, one finds that the first reflection arrives at the wellhead 0.4 seconds after the start of the initial impulse. Multiplying by the wavespeed and then dividing by 2 yields the depth of 1000 ft. One knows that the characteristic impedance of the reflector is greater than that of the well because the harmonics between it and the wellhead are even (FIG. 9) and because the first reflected wave to the return to the well head (FIG. 8) has the same polarity as the initial impulse.

Figure 11:
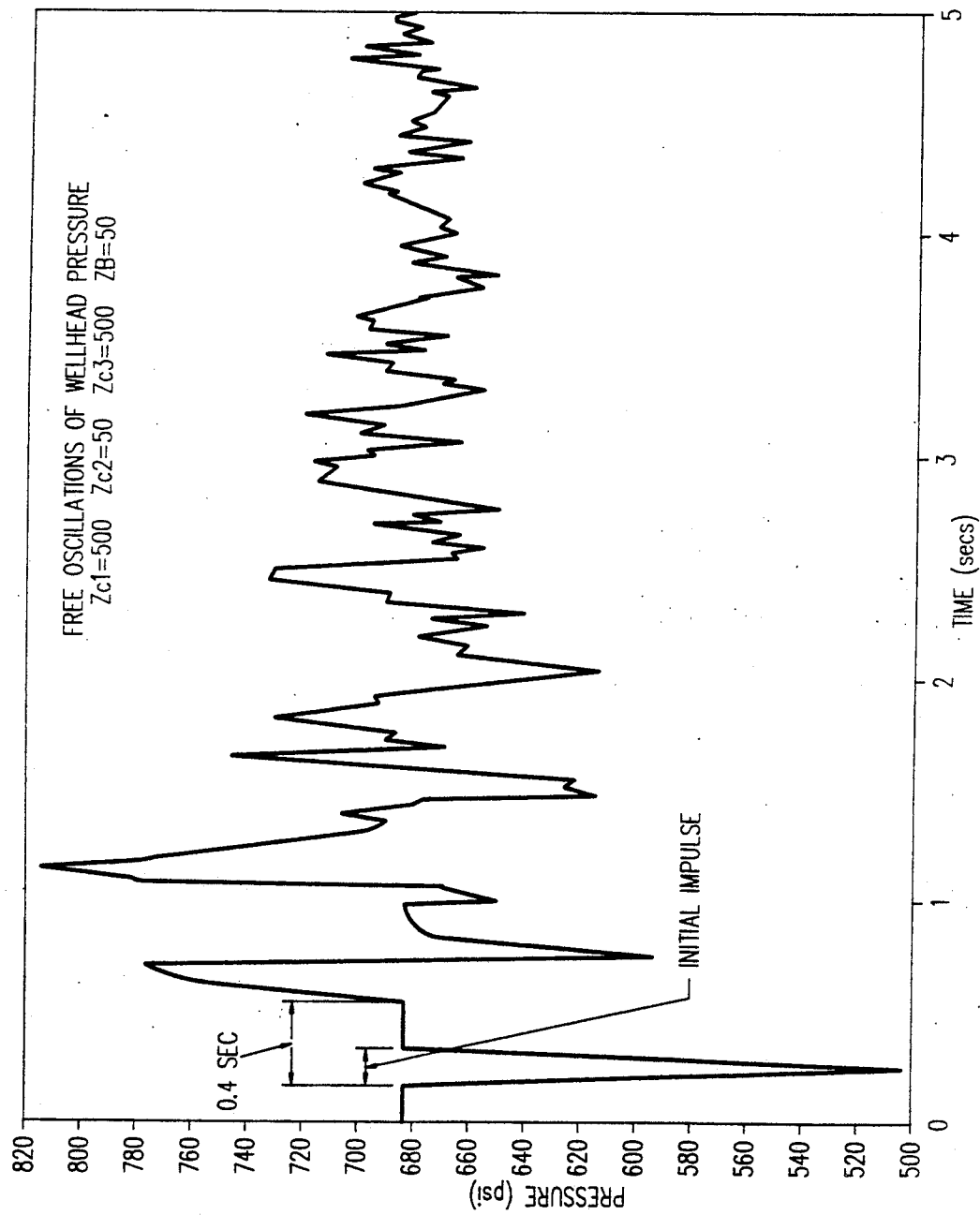
FIG. 11 shows a wellhead pressure plot for the case where the bottom of the well is open and for a reflector of impedance less than that of the wellbore.
Figure 12:
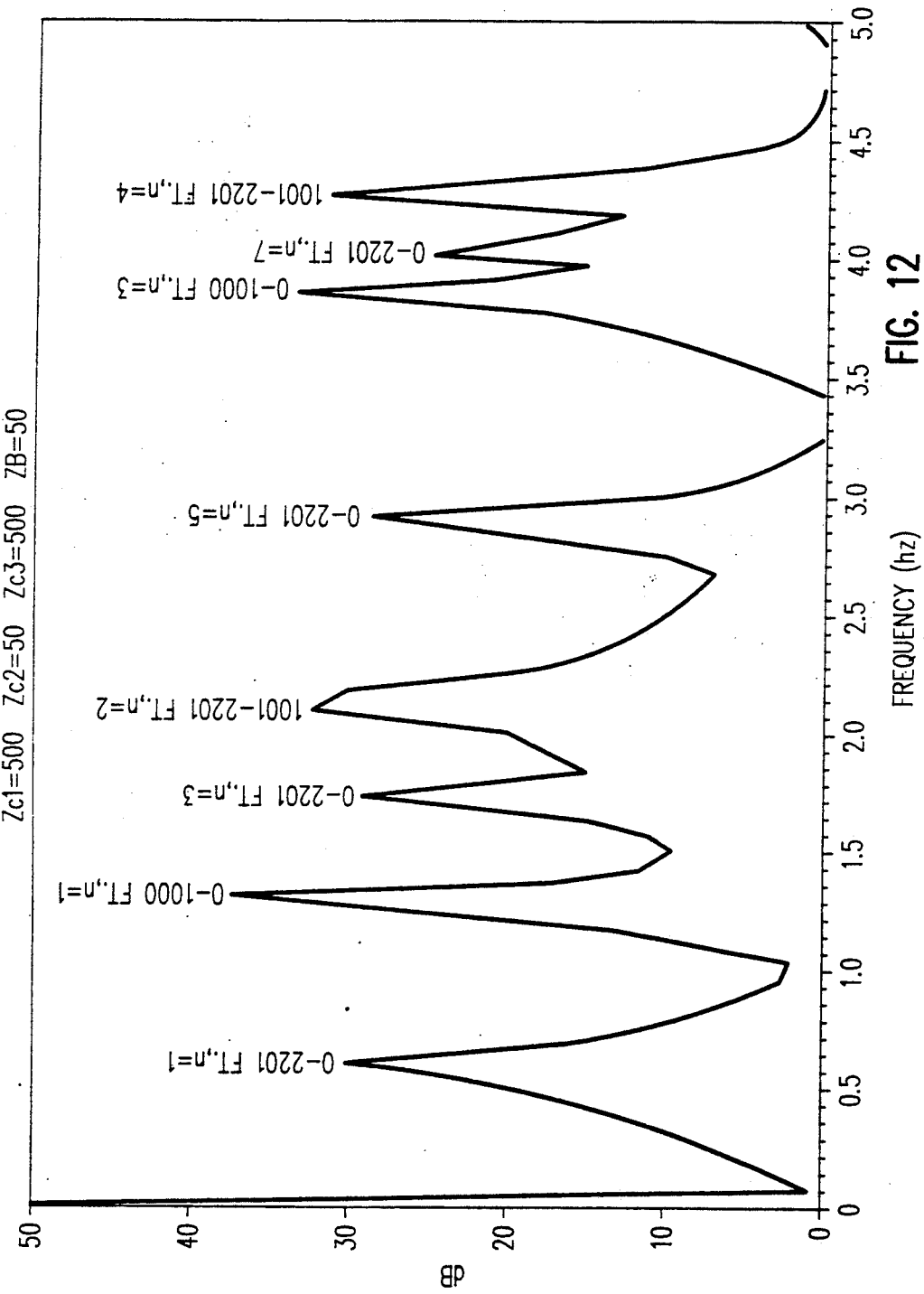
FIG. 12 shows a frequency domain plot versus decibels of the data in FIG. 11.
Figure 13:
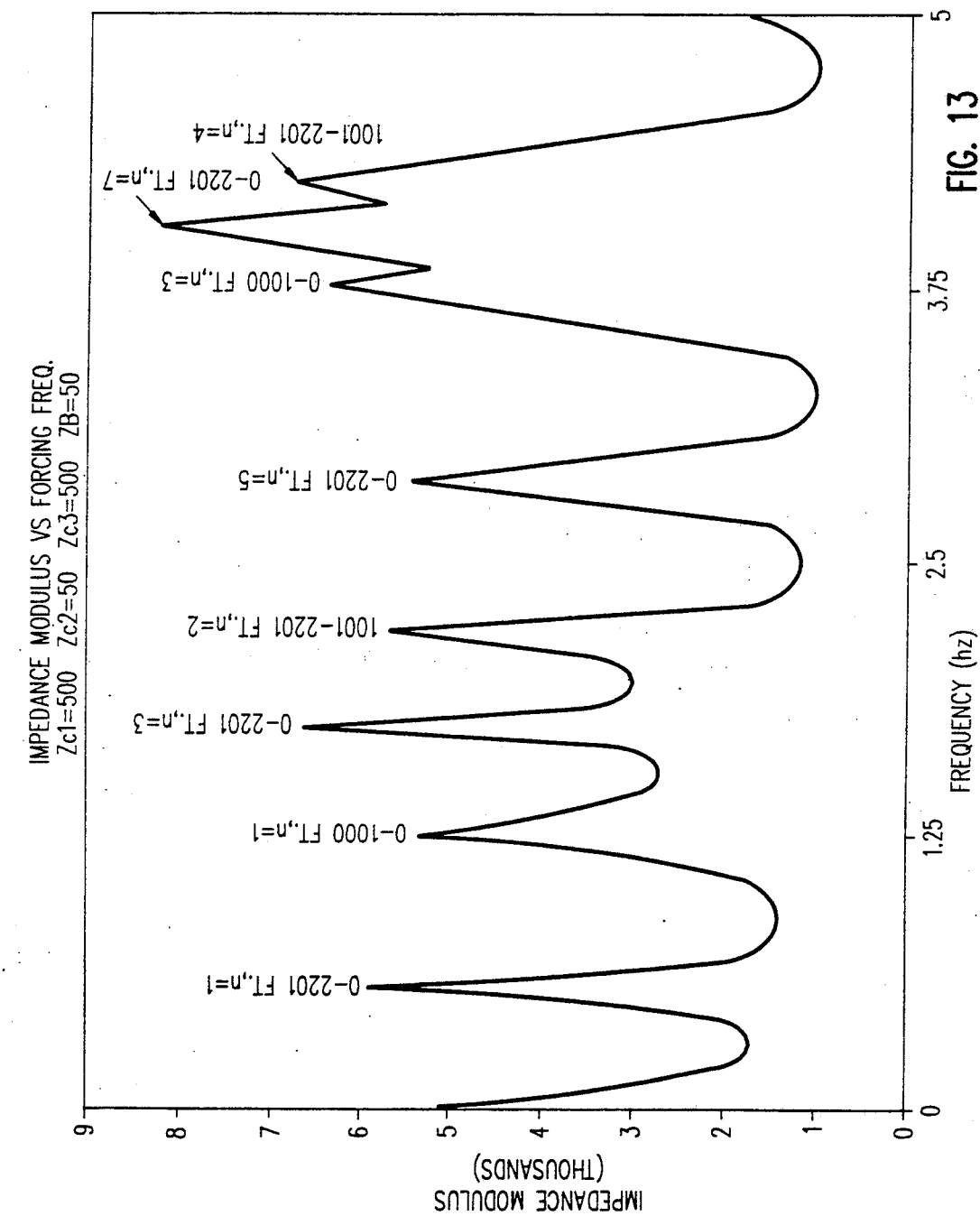
FIG. 13 shows a frequency domain plot of wellhead impedance for forced oscillations, for the case shown in FIG. 11.

Finally, consider a well as in FIG. 1 in which the bottom is a constant-pressure boundary and in which the reflector at 1000 ft. has a characteristic impedance lower than that of the wellbore. FIGS. 11 and 12 show the pressure oscillations and resonant frequencies that result from impulsive excitation of such a well. As in the previous example (FIG. 9) the reflection off the bottom of the well produces odd harmonics with a fundamental frequency (n=1) of 0.57 hz. This frequency and the n=3,5, and 7 harmonic resonances clearly show up in the frequency domain plot (FIG. 12). The other resonances are in the section of the well above the reflector and the section below the reflector. The 1200-ft. section produces even harmonics and the 1000-ft. section produces odd harmonics, both of which are shown clearly in FIG. 12. To determine which of these depths is the depth from the wellhead to the reflector, one refers to the pressure oscillation plot (FIG. 11). As in the previous examples, one finds that the first reflection arrives at the wellhead 0.4 seconds after the start of the initial impulse. Multiplying by the wavespeed and then dividing by 2 yields the depth of 1000 ft.

Figure 14:
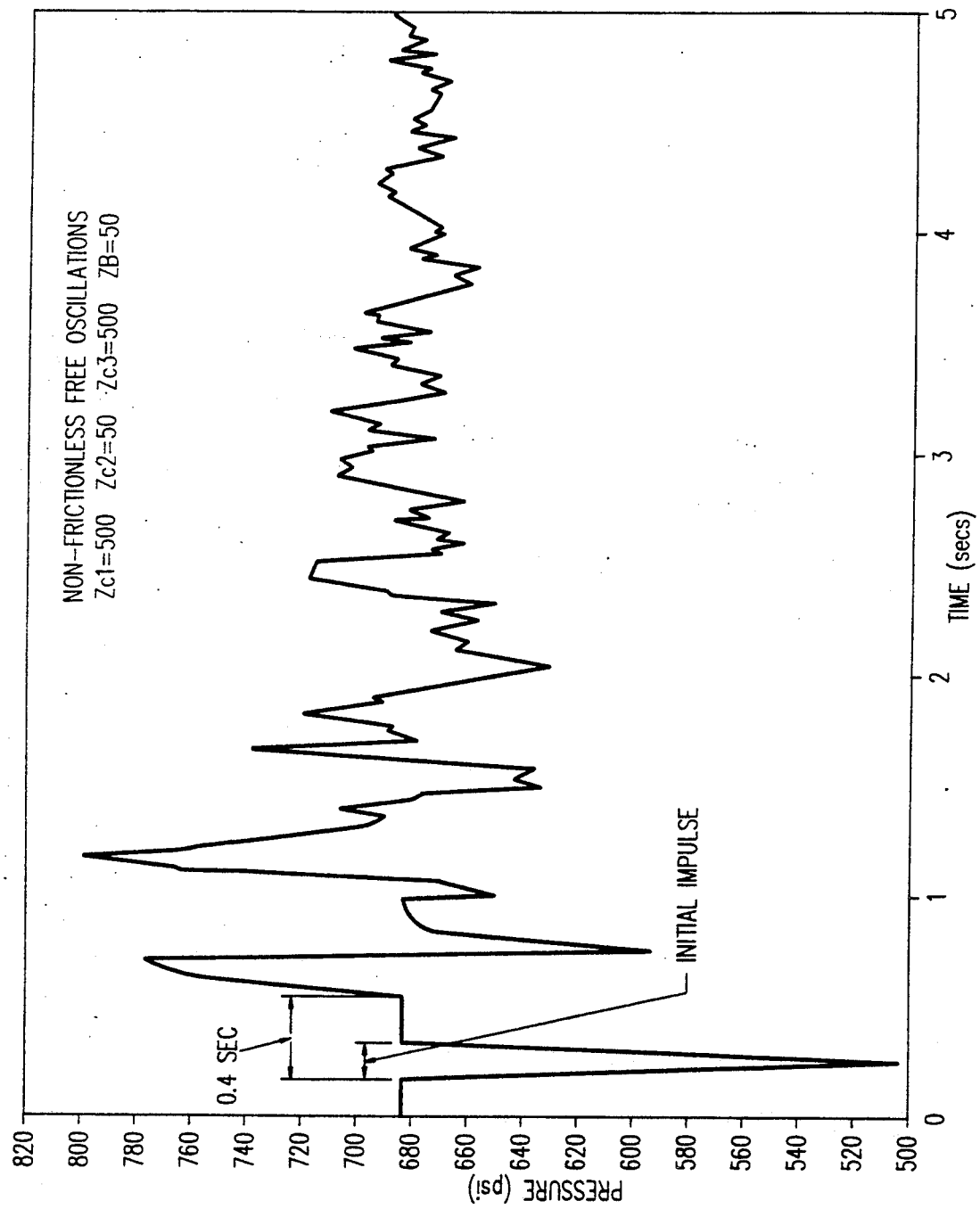
FIG. 14 shows a wellhead pressure plot for a well with high viscosity fluid.

The free-oscillation examples above are for fluid viscosities of 1 centipoise. FIGS. 14 and 15 show free-oscillation behavior and the frequency spectrum for a well with 10 centipoise-viscosity fluid. The boundary conditions are the same as in the last example: the bottom is a constant-pressure boundary and the reflector at 1000 ft. has a characteristic impedance lower than that of the wellbore. One finds by comparison of FIGS. 15 and 12 that the resonance frequencies in and for the two different fluid viscosities is the same, proving the generality of the inventive method.

The foregoing discussion of free oscillations has shown that it is possible, using the method of the invention, to locate a downhole reflector and to determine whether its characteristic impedance is greater or less than that of the well, regardless of the boundary condition at the bottom of the well. Furthermore, a plurality of reflectors can be located in a single well using the method of the invention, and their impedances relative to the well itself can be determined. The same procedure as outlined above is followed, care being taken to differentiate the harmonic frequencies of each reflector during the analysis.

The quantitative magnitude of the impedance of the reflector can also be determined using the method of the present invention. Equations 25 and 28 relate the decay rate of free oscillations to the impedance of the downstream end of a section of pipe, $Z_D$. One can generalize these equations by writing $$\alpha = \frac{a}{2l} \ln \left| \frac{Z_{c2} - Z_{c1}}{Z_{c2} + Z_{c1}} \right| \qquad (31)$$

which states that the decay rate of free oscillations is proportional to the natural log of the absolute value of the reflection coefficient at the downstream end of the pipe. One wishes to determine the magnitude of $Z_{c2}$, which is the characteristic impedance of the feature of interest. One therefore must isolate the resonant frequencies in the zone, say, between the wellhead and the reflection point. This can be done by filtering out the other resonant frequencies in the well, using techniques well known in the art, and replotting a time series with only the frequencies of interest. The decay rate $\alpha$ per second (or per some convenient time interval) is then determined from the decay of the subject oscillations. Decay rate will be a number between 0 (no decay) and 1 (instantaneous decay) per second. After $\alpha$ is found, it is substituted into equation 31 along with the fluid wavespeed a, characteristic impedance $Z_{c1}$ and length $l$ of the section of pipe between the wellhead and the reflector. One then solves for $Z_{c2}$. After the value of this downhole impedance has been determined in this manner, the magnitude of the wavespeed change or well cross section change can be estimated using equation 9. For example, if the reflection is caused by crushed or sheared casing, the wavespeed at the depth of damage will not have changed, but the cross-sectional area of the fluid will be smaller than normal. Equation 9 reveals the actual cross-sectional area at this point. Knowledge of the cross-sectional area can then be used in planning remedial action. For example, it will determine the size of wireline tools that can be lowered past that point of the well. Another example is determining the diameter of a washed-out zone in a well prior to cementing casing into the well. The diameter of enlargements of this sort are important in calculating the required volume of cement.

USE OF FORCED OSCILLATIONS OF PRESSURE TO LOCATE AND EVALUATE DOWNHOLE FEATURES

A steady oscillatory flow may be forcibly created at the wellhead (or anywhere in a well) by the action of a pump. Such oscillations are termed forced oscillations because the pump determines their frequency. Forced-oscillation conditions are also advantageously used in the present invention to locate and characterize downhole features.

Under these conditions the method of the present invention takes the following approach. The impedance transfer equation (Wylie and Streeter, (1982)

$$Z_U = \frac{Z_D + Z_c \tanh(\gamma l)}{1 + \frac{Z_D}{Z_c} \tanh(\gamma l)} \qquad (32)$$

gives the hydraulic impedance at the upstream end of a pipe in terms of the hydraulic impedance at the downstream end. One can use this expression to determine the resonant frequencies of a single section of a well, or of any entire well composed of a series of discrete sections.

When the pump is turned on, sinusoidal oscillations develop at each point in the system at the frequency of the forcing function and will not decay in time, i.e., $\alpha = 0$. The propagation constant becomes $$\gamma = \frac{i\omega}{a} \qquad (33)$$

The magnitude of the hydraulic impedance $Z_U$ at the wellhead is found from the amplitudes of pressure and discharge oscillations at the wellhead according to the formula:

$$|Z_U| = \left| \frac{H_U}{Q_U} \right| \qquad (34)$$

Combining the expressions for $Z_U$ and $\gamma$ with the definition of the magnitude of a complex number results in the following expression for the impedance at the upstream boundary (typically the wellhead) where the forcing function, i.e., pumping action, is being applied.

sure-time data or by processing the pressure-time history into frequency domain information using techniques well known in the art of signal processing.

The impedance transfer equation 35 was used to plot the absolute value of the wellhead impedance versus the frequency of the forcing function for the wellbore geometry shown in FIG. 1 and the four sets of boundary conditions described in the foregoing discussion of free oscillations. The well is composed of three hydraulic elements, each with a different length: a 1000-ft. section is uppermost, a 1-ft. section is below it, and a 1200-ft. section is at the bottom. Equation 35, which is for a single section of pipe, can be used for more complicated geometries (such as this example well) by treating the well as a series of pipes. The downstream impedance of one pipe is simply the upstream impedance of the next lower pipe. This construction results in a set of equations that is solved simultaneously to define the frequency response characteristic of the well.

FIGS. 4, 7, 10 and 13 show the wellhead impedance magnitudes for the four sets of boundary conditions. Comparison with FIGS. 3, 6, 9 and 12, which are the corresponding frequency domain plots for free oscillations, reveals the same resonant frequencies that we found for the free-oscillation cases. Thus, the resonant frequencies of a pipe or well subjected to forced oscillation are identical to the resonant frequencies found from free-oscillation behavior. There are small differences in the relative amplitudes of the frequency peaks for forced oscillations compared to free oscillations. These amplitude differences arise from the frequencies contained in the impulse that was used to numerically generate the free oscillations. The energy in this impulse was not distributed evenly among the several resonant frequencies. In the simulation of forced-oscillation behavior (FIGS. 4, 7, 10 and 13) the energy distribution was more uniform across the frequency spectrum.

The forced-oscillation analysis means that, if the hy- $$|Z_U| = \frac{\sqrt{\left(Z_D\left(1 + \tan\left(\frac{\omega l}{a}\right)^2\right)\right)^2 + \left(Z_c \tan\left(\frac{\omega l}{a}\right) - \frac{Z_D^2}{Z_c}\tan\left(\frac{\omega l}{a}\right)\right)^2}}{1 + \left(\frac{Z_D}{Z_c}\tan\left(\frac{\omega l}{a}\right)\right)^2}$$

If $l$ and $Z_U$ are known, the downstream impedance is the only variable in equation 35 and it can be found with the use of an iterative solution.

If $l$ is not known beforehand, which would be the case when trying to locate an unanticipated reflector, another approach is needed in order to solve for both $l$ and $Z_D$. To determine these values one must find the resonant frequencies of the system. At the resonant frequencies the impedance at the wellhead is at a local maximum in the frequency domain. Because the flow per pump stroke is essentially constant under forced-oscillation conditions, equation 34 teaches that the amplitude of the pressure oscillations is therefore also at a local maximum at each of the resonant frequencies of the well. These local maxima of pressure correspond to local maxima of impedance using the technique of the invention. The resonant frequencies are therefore found by varying the pump frequency over a suitable range (i.e., by varying the forcing function) and measuring the wellhead pressure oscillations at each frequency. Pressure oscillation amplitude is then plotted as a function of frequency. This can be done manually from the presdraulic impedances at both ends of a hydraulic element are greater or less than the characteristic impedance of the element, the resonant frequencies of the element are:

$$\omega = \frac{n\pi a}{2l} \quad n = 2,4 \qquad (36)$$

However, if the hydraulic impedance at one end is greater than the characteristic impedance of the element, and at the other end it is less, the resonant frequencies of the element are:

$$\omega = \frac{n\pi a}{2l} \quad n = 1,3 \qquad (37)$$

These equations are the same as equations 30 and 27 which were developed for free-oscillation conditions. Thus, it is also possible to use forced-oscillation measurements to determine the distances $l$ to unanticipated downhole impedance contrasts by: 1. measuring their resonant frequencies, 2. determining whether the harmonics are odd or even, and 3. then using the last two equations to evaluate 1.

After resonant frequencies $\omega$ and lengths $l$ have been determined, the characteristic impedance ($Z_D$ in equation 35) of the reflector of interest can also be found. This is done by substituting these values along with the upstream impedance, $Z_U$, at resonance into equation 35 and solving for $Z_D$. After $Z_D$ has been found in this manner, equation 9 is used to estimate the hydraulic cross section or wavespeed change at the reflector, and this information is applied to determine the cause of the downhole feature (stuck tool, pinched casing, wash out, bad cement job, etc.).

The foregoing description is not intended to be construed in a limiting sense. Various modifications of the disclosed embodiment, as well as other embodiments of the invention, will be apparent to persons skilled in the art.

The invention is therefore to be limited only by the claims that follow.

We claim:

1. A method of using the resonant properties of a well to characterize well features comprising the steps of:
   creating pressure oscillations in a fluid in the well;
   determining the resonant frequencies present in the pressure oscillations;
   computing the resonant frequencies produced by any known well feature;
   separating resonant frequencies produced by the known feature from the remaining resonant frequencies;
   determining which of the remaining resonant frequencies originate from a particular reflector; and
   determining characteristics of the particular reflector from the remaining resonant frequencies originating from the particular reflector.

2. The method of claim 1, further comprising the step of filling the well with fluid until a positive pressure is attained at all points in the well, prior to the first step of determining.

3. The method of claim 1, further comprising the step of determining the velocity of pressure waves in the fluid in the well, after the first step of determining.

4. The method of claim 1, further comprising the step of determining whether the resonant frequencies from the particular reflector are even or odd harmonics, and what the numbers of the harmonics are.

5. The method of claim 4, further comprising the step of determining the distance from the wellhead to the particular reflector.

6. The method of claim 1, further comprising the step of determining the magnitude of the characteristic impedance of the particular reflector.

7. The method of claim 6, wherein the step of determining the magnitude includes observing the decay rate of free oscillations from the particular reflector.

8. The method of claim 6, further comprising the step of estimating the hydraulic cross section at the particular reflector from the magnitude of the characteristic impedance of the reflector.

9. The method of claim 6, further comprising the step of estimating a wavespeed at the reflector from the magnitude of the characteristic impedance of the reflector.

10. The method of claim 4, further comprising the step of determining that the hydraulic impedance of the reflector is greater than a characteristic impedance of the well when the reflector displays even harmonics, and that the hydraulic impedance of the reflector is less than the characteristic impedance of the well when the reflector displays odd harmonics.

11. The method of claim 5, wherein the oscillations are free oscillations, and the step of determining the distance includes calculating the distance from the frequency of the free oscillations, the harmonic number, and a wavespeed in the fluid.

12. The method of claim 1, wherein the first step of determining includes positioning at least one transducer in the well.

13. The method of claim 1, wherein the first step of determining includes positioning at least one transducer on the well.

14. The method of claim 1, wherein the first step of determining includes positioning at least one transducer on the wellhead.

15. The method of claim 1, wherein the first step of determining includes measuring the pressure of the oscillations.

16. The method of claim 1, wherein the first step of determining includes measuring the frequency of the oscillations.

17. The method of claim 1, wherein the first step of determining includes measuring at more than one point in the well.

18. The method of claim 1, wherein the step of creating pressure oscillations includes generating free oscillations.

19. The method of claim 18, wherein the step of free oscillations includes rapidly opening and closing a valve to release an amount of the fluid in the well.

20. The method of claim 18, wherein the generating of free oscillations includes pressurizing the well by use of a gas.

21. The method of claim 1, wherein the step of creating pressure oscillations includes generating forced oscillations.

22. The method claim 21, wherein the generating of forced oscillations includes the cyclic action of a pump means to oscillate the fluid at a controlled frequency.

23. The method of claim 1, wherein the wellhead is closed.

24. The method of claim 1, wherein the wellhead is open.

25. The method of claim 1, wherein the wellhead is partially open.

26. The method of claim 1, wherein the step of computing the resonant frequencies includes performing a time-domain to frequency-domain conversion of the oscillations as measured in the first step of determining.

27. The method of claim 1, wherein the bottom of the well is open.

28. The method of claim 1, wherein the bottom of the well is closed.

29. The method of claim 1, wherein the bottom of the well is partially open.

30. The method of claim 1, wherein the well is cased.

31. The method of claim 1, wherein the well is uncased.

32. The method of claim 1, wherein the well is partially cased.

33. The method of claim 1, wherein the characteristics of a plurality of reflectors are determined.

34. The method of claim 1, wherein there are a plurality of fluids in the well.

35. The method of claim 1, further comprising the steps of:
 determining a magnitude of a characteristic impedance of the reflector; and
 determining compressibility of the reflector from the magnitude of its characteristic impedance.

36. The method of claim 1, wherein the step of creating oscillations includes the step of creating oscillations having a predetermined range of frequencies.

37. A method of using the resonant properties of a well to characterize well features comprising the steps of:
 positioning at least one transducer in the well;
 filling the well with fluid so as to obtain a positive pressure at all points in the well;
 creating pressure oscillations in the fluid;
 measuring the amplitude of the pressure oscillations;
 determining the wavespeed of the pressure oscillations with the transducer;
 determining the resonant frequencies present in the pressure oscillations;
 computing the resonant frequencies produced by any known well feature;
 separating the resonant frequencies produced by the known features from the remaining resonant frequencies;
 determining which of the remaining resonant frequencies originate from a particular reflector;
 determining whether the resonant frequencies from the particular reflector are even or odd harmonics; and
 for the particular reflector, determining whether the characteristic impedance of the reflector is greater or less than the characteristic impedance of the well.

38. The method of claim 37, further comprising the step of determining the distance from the wellhead to the reflector.

39. The method of claim 37, further comprising the step of determining the magnitude of the characteristic impedance of the particular reflector from the decay rate of free oscillations from the particular reflector.

40. The method of claim 37, further comprising the step of estimating the hydraulic cross section and wavespeed at the particular reflector from the magnitude of the characteristic impedance.

41. The method of claim 37, further comprising the steps of measuring the frequency of the pressure oscillations.

42. The method of claim 37, wherein the wellhead is closed.

43. The method of claim 37, wherein the wellhead is open.

44. The method of claim 37, wherein the wellhead is partially open.

45. The method of claim 37, wherein the step of determining resonant frequencies includes performing a time-domain to frequency-domain conversion of the oscillations as measured in the step of measuring.

46. The method of claim 37, wherein the bottom of the well is closed.

47. The method of claim 37, wherein the bottom of the well is open.

48. The method of claim 37, wherein the bottom of the well is partially open.

49. The method of claim 37, wherein the well is closed.

50. The method of claim 37, wherein the well is uncased.

51. The method of claim 37, wherein the well is partially cased.

52. The method of claim 37, wherein the step of creating pressure oscillations includes generating forced oscillations.

53. The method of claim 37, wherein the step of creating pressure oscillations includes generating free oscillations.

54. The method of claim 37, wherein there are a plurality of fluids in the well.

55. A method for characterizing features in a well comprising the steps of:
 creating pressure oscillations in a fluid in the well;
 determining a spectrum of resonant frequencies present in the pressure oscillations; and
 determining characteristics of at least two well features from the spectrum of resonant frequencies.

56. A method for characterizing well features comprising the steps of:
 filling the well with a fluid until a positive pressure is attained at all points in the well;
 determining a spectrum of resonant frequencies present in pressure oscillations in the fluid; and
 determining characteristics of at least two well features from the resonant frequencies spectrum.

57. A method for characterizing well features, comprising the steps of:
 determining the velocity of pressure waves in a fluid in the well; and
 determining characteristics of at least two well features from the velocity of the pressure waves.

58. A method for characterizing well features, comprising the steps of:
 separating resonant frequencies of any known features in the well from other resonant frequencies in the well; and
 determining characteristics of at least two unknown well features from the other resonant frequencies.

59. A method for characterizing well features, comprising the steps of:
 determining whether the resonant frequencies of the features are even or odd harmonics; and
 determining the characteristics of at least two features from whether their resonant frequencies are even or odd harmonics.

60. A method for characterizing at least two well features, comprising the steps of:
 determining the number of the harmonic of a resonant frequency associated with the features; and
 determining characteristics of the features from the number of the harmonic.

61. A method for determining the distances from a wellhead to at least two well features, comprising the steps of:
 determining the resonant frequencies present in pressure oscillations in a fluid in the well;
 determining wavespeeds in the fluid in the well; and
 determining the distances from the resonant frequencies and wavespeeds.

62. A method for characterizing at least two well features, comprising the steps of:
 determining the magnitude of the characteristic impedances of the features; and
 determining characteristics of the well features from the magnitude of the characteristic impedances.

63. A method for characterizing at least two well features, comprising the steps of:
estimating the hydraulic cross section at the depths of the features or the cross sectional area of the features themselves from the magnitude of the characteristic impedances of the features; and
determining characteristics of the well features from the hydraulic cross section or the cross sectional area.

64. A method for characterizing well features, comprising the steps of:
estimating a wave speed in a fluid in the well at at least two of the features; and
determining the characteristics of the two well features from the wave speed.

65. A method for characterizing well features, comprising the steps of:
measuring the amplitude of pressure oscillations in a fluid in the well; and
determining characteristics of at least two well features from the amplitude.

66. A method for characterizing well features, comprising the steps of:
creating pressure oscillations in a fluid filling the well; and
characterizing at least two well features from the pressure oscillations.

67. The method of claim 37, wherein the step of creating oscillations includes the step of creating oscillations having a predetermined range of frequencies.

68. A method of using the resonant properties of a well to characterize well features comprising the steps of:
creating pressure oscillations in a fluid in the well;
measuring the pressure oscillations;
determining the resonant frequencies present in the pressure oscillations;
for a particular well feature, determining from the resonant frequencies whether a characteristic impedance of the well feature is greater or less than a characteristic impedance of the well.

69. A method of using the resonant properties of a well to characterize well features comprising the steps of:
creating pressure oscillations in a fluid in the well;
measuring the pressure oscillations;
determining the resonant frequencies present in the pressure oscillations;
computing the resonant frequencies produced by any known well feature;
determining which of the resonant frequencies originate from a particular well feature; and
for a particular well feature, determining whether a characteristic impedance of the well feature is greater or less than a characteristic impedance of the well.

70. A method for characterizing well features comprising the steps of:
creating pressure oscillations in a fluid in the well;
measuring the oscillations;
determining resonant frequencies present in the oscillations; and
determining the characteristics of at least two well features located at different levels in the well from the resonant frequencies.

71. A method for characterizing well features comprising the steps of:
creating pressure oscillations in a fluid in the well;
measuring the oscillations; and
determining the characteristics of at least two well features of different types from the resonant frequencies.

* * * * *